US012764502B2

(12) United States Patent
Pan et al.

(10) Patent No.: US 12,764,502 B2
(45) Date of Patent: Oct. 13, 2026

(54) SYSTEM INFORMATION TRANSMISSION METHOD AND APPARATUS

(71) Applicant: HUAWEI TECHNOLOGIES CO., LTD., Shenzhen (CN)

(72) Inventors: Xiaodan Pan, Shanghai (CN); Yunlong Gao, Hefei (CN); Wenjie Peng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 355 days.

(21) Appl. No.: 18/504,881

(22) Filed: Nov. 8, 2023

(65) Prior Publication Data

US 2024/0080644 A1 Mar. 7, 2024

Related U.S. Application Data

(63) Continuation of application No. PCT/CN2022/091229, filed on May 6, 2022.

(30) Foreign Application Priority Data

May 9, 2021 (CN) ........................ 202110504160.X

(51) Int. Cl.
*H04W 4/06* (2009.01)
*H04W 48/10* (2009.01)

(52) U.S. Cl.
CPC ............. *H04W 4/06* (2013.01); *H04W 48/10* (2013.01)

(58) Field of Classification Search
CPC ........................................................ H04W 4/06
See application file for complete search history.

(56) References Cited

U.S. PATENT DOCUMENTS

| | | | | |
|---|---|---|---|---|
| 2018/0324679 | A1* | 11/2018 | Basu Mallick | H04W 72/20 |
| 2022/0141756 | A1 | 5/2022 | Pan | |
| 2023/0300725 | A1* | 9/2023 | Basu Mallick | H04W 48/14 370/329 |

FOREIGN PATENT DOCUMENTS

| | | | | |
|---|---|---|---|---|
| EP | 2018008 A1 * | 1/2009 | | H04W 4/06 |
| WO | WO-2021134162 A1 * | 7/2021 | | H04W 76/20 |

OTHER PUBLICATIONS

"SI acquisition, CN Registration and RNAU," 3GPP TSG-RAN WG2 Meeting #113 electronic Online, R2-2101210, XP051972851, total 2 pages, 3GPP—3rd Generation Partnership Project, Valbonne, France (Jan. 25-Feb. 5, 2021).

(Continued)

*Primary Examiner* — Pamit Kaur
(74) *Attorney, Agent, or Firm* — Leydig, Voit & Mayer, Ltd.

(57) ABSTRACT

This application provides a system information (SI) transmission method and apparatus. The method includes: The first terminal device receives a first request message sent by the one or more second terminal devices. The first request message is used to request to obtain M system information blocks (SIBs) or system information (SI) messages of a serving cell. The first terminal device determines N destination identifiers corresponding to the M SIBs or SI messages, where N is an integer greater than or equal to 1, and N≤M. The first terminal device sends, based on the N destination identifiers, the M SIBs or SI messages to the one or more second terminal devices in a broadcast or multicast manner. According to the method, the SI may be transmitted on an SL in the multicast or broadcast manner. This improves SI transmission efficiency and SI update efficiency.

16 Claims, 6 Drawing Sheets

100

(56) References Cited

OTHER PUBLICATIONS

"Summary document of AI 8.7.4.1," 3GPP TSG-RAN WG2 Meeting #113bis electronic Online, R2-2104503, R2-2104503, XP051995185, total 16 pages, 3GPP—3rd Generation Partnership Project, Valbonne, France (Apr. 12-20, 2021).
"System Information acquisition by a remote UE," 3GPP TSG-RAN WG2 Meeting #116bis electronic Online, R2-2200412, XP052091122, total 4 pages, 3GPP—3rd Generation Partnership Project, Valbonne, France (Jan. 12-25, 2022).
"SI acquisition, CN Registration and RNAU," 3GPP TSG-RAN WG2 Meeting #114 electronic Online, R2-2105076, XP052003776, total 3 pages, 3GPP—3rd Generation Partnership Project, Valbonne, France (May 19-27, 2021).

* cited by examiner

SYSTEM INFORMATION TRANSMISSION METHOD AND APPARATUS

CROSS-REFERENCE TO RELATED APPLICATIONS

This application is a continuation of International Application No. PCT/CN2022/091229, filed on May 6, 2022, which claims priority to Chinese Patent Application No. 202110504160.X, filed on May 9, 2021. The disclosures of the aforementioned applications are hereby incorporated by reference in their entireties.

TECHNICAL FIELD

This application relates to the communication field, and more specifically, to a system information (SI) transmission method and apparatus in the communication field.

BACKGROUND

To improve cell coverage, a terminal device-to-network device relay technology, namely, a "UE-to-Network relay" communication system, is introduced. The communication system may include a radio access device, remote user equipment (remote UE), relay user equipment (relay UE), and the like. A communication connection is established between the relay UE and the radio access device, a sidelink (SL) connection is established between the remote UE and the relay UE, and the remote UE may establish a connection to the radio access device through the relay UE, to obtain a network service. The relay UE and the radio access device may communicate with each other through a Uu interface. The remote UE and the relay UE communicate with each other through a PC5 interface.

For example, a base station is used as the radio access device, and the base station may broadcast system information (SI) to the relay UE. How the remote UE obtains the SI from the relay UE is a problem that needs to be resolved currently.

In an embodiment, the remote UE may request to obtain the SI from the relay UE by using a PC5 radio resource control (PC5-RRC) message or PC5-S signaling (PC5-S) of the PC5 interface, that is, in an "on-demand SI" manner. Then, the relay UE requests the SI from the base station. After obtaining the SI broadcast by the base station, the relay UE sends the SI to the remote UE through unicast communication on an SL.

When one relay UE is connected to a plurality of remote UEs, and the plurality of remote UEs request same SI from the relay UE, each remote UE needs to request the SI from the relay UE by using the PC5-RRC message, and then the relay UE needs to send, on the SL, the same SI to each remote UE in a unicast communication manner. In a transmission process of the SI, a sidelink resource needs to be allocated for unicast communication between the relay UE and each remote UE. This may occupy a large quantity of SL resources, causing a waste of SL resources and low transmission efficiency. Therefore, how the relay UE forwards the SI to the remote UE is a problem that needs to be urgently resolved currently.

SUMMARY

This application provides a system information (SI) transmission method and apparatus. According to the method, SI may be transmitted on an SL in a multicast or broadcast manner. This improves SI transmission efficiency and SI update efficiency.

According to a first aspect, an information transmission method is provided. The method is applied to a system including a first terminal device and one or more second terminal devices. The first terminal device establishes a sidelink (SL) connection to each second terminal device, and each second terminal device obtains a network service of a target cell through the first terminal device. The target cell is a serving cell of the first terminal device. The method includes:

The first terminal device receives a first request message sent by the one or more second terminal devices. The first request message is used to request to obtain M system information blocks (SIBs) or system information SI messages of the target cell.

The first terminal device determines N destination identifiers corresponding to the M SIBs or SI messages, where N is an integer greater than or equal to 1, and N≤M.

The first terminal device sends a second message to the one or more second terminal devices in a broadcast or multicast manner. The second message includes the M SIBs or SI messages, and the second message includes the corresponding destination identifiers.

It should be understood that remote UE may send a first request message to relay UE, to request to obtain system information required by the remote UE. Specifically, the first request message may be used by one or more remote UEs to request required M SI messages, or the first request message may be used by one or more remote UEs to request required M SIBs. A system message requested by each remote UE may be one or more SI messages of the M SI messages, or a system message requested by each remote UE may be one or more SIBs of the M SIBs. This is not limited in embodiments of this application.

Optionally, the second message may represent one message. For example, the second message is one broadcast message, to be specific, the broadcast message includes all the M SIBs or SI messages requested by the one or more second terminal devices.

Alternatively, the second message may represent a plurality of messages. For example, the second message corresponds to a plurality of multicast messages, to be specific, the plurality of multicast messages include all the M SIBs or SI messages requested by the one or more second terminal devices, each multicast message may include one or more SIBs or SI messages requested by a current second terminal device, and the SIB and the SI message included in each multicast message belong to one group.

In related descriptions of this application, "sending the second message" and "sending the M SIBs or SI messages" represent a same meaning, to be specific, the first terminal device sends a requested SIB or SI message to the one or more second terminal devices in a manner of sending one or more messages. It should be understood that regardless of whether the second message is used as one message or corresponds to a plurality of different independent messages, the second message falls within the protection scope of embodiments of this application. Details are not described subsequently.

In conclusion, according to the method provided by this application, the relay UE may send the SI message or the SIB to the one or more remote UEs in a multicast message manner or a broadcast message manner. For example, when the relay UE sends the SI message or the SIB to the one or more remote UEs in the broadcast message manner, the relay UE does not occupy more SL resources to send the system information to the plurality of remote UEs through unicast communication. This saves a communication resource.

Alternatively, when the relay UE receives an SI request from the one or more remote UEs to request to obtain the SI message or the SIB, the relay UE may group all SI messages or SIBs into one group and assign a multicast identifier L2ID to the group, and send the multicast identifier L2ID to each remote UE in a unicast manner. Alternatively, all SI messages or SIBs are grouped into a plurality of groups (for example, N groups), one multicast identifier L2ID is assigned to each group, and a first mapping relationship between the multicast identifier L2ID and the SI message or the SIB is sent to each remote UE in a unicast manner. Subsequently, the relay UE may send the SI to the one or more remote UEs in a manner of sending the multicast message on an SL. This improves SI sending efficiency. In addition, when the multicast identifier or the SI changes, the relay UE may further maintain information about the first mapping relationship between the multicast identifier L2ID and the SI message or the SIB, and notify, on the SL, a related remote UE in the unicast manner. This further improves SI sending efficiency and SI update efficiency.

In an embodiment, the first request message may be sent by using radio resource control RRC signaling, media access control (MAC)-control element (CE) signaling, sidelink control information (SCI), or PC5-S signaling on the sidelink. For example, the remote UE may send a system message request to the relay UE by using PC5-RRC signaling.

With reference to the first aspect, in some possible embodiments, that the first terminal device determines N destination identifiers corresponding to the M SIBs or SI messages includes:

The first terminal device determines that the M SIBs or SI messages correspond to one same destination identifier. The destination identifier indicates to send the M SIBs or SI messages in the broadcast manner.

Alternatively, the first terminal device determines that each of the M SIBs or SI messages corresponds to a different destination identifier. The destination identifier indicates to send the M SIBs or SI messages in the multicast manner.

Alternatively, the first terminal device determines that K SIBs or SI messages of the M SIBs or SI messages correspond to one same destination identifier, where $1 \leq K < M$. The destination identifier indicates to send the M SIBs or SI messages in the multicast manner.

For multicast, an application layer provides information about the multicast identifier, and the relay UE may convert the multicast identifier into a DST ID. If the information about the multicast identifier is not provided, the relay UE may determine the multicast identifier by using a mapping relationship between a service type and the DST ID in a broadcast mechanism.

In the foregoing manner, when the remote UE requests to obtain the SI from the relay UE in an on-demand manner, the relay UE may deliver the SI to the remote UE in the multicast manner. The remote UE may group all the M SI messages that the relay UE requests to obtain into N groups, and assign one multicast identifier L2ID to each group, so that the remote UE receives SI messages of different groups by using different multicast identifiers L2IDs.

Optionally, a base station may also perform grouping based on historical information about the system message request. For example, the base station may group, based on the historical information, system messages that are usually simultaneously requested into one group, and then notify the relay UE of group information. Then, the relay UE assigns L2IDs to different groups. Alternatively, the base station may assign L2IDs, and notify the relay UE of a correspondence between the group and the L2ID. Finally, the relay UE directly uses a mapping relationship configured by the base station.

In addition, the relay UE may further update a grouping manner based on a requirement. For example, SIB messages or SI messages simultaneously requested by the remote UE are grouped into one group as much as possible based on a system message request condition of the remote UE in a current or recent period of time, so that the SIB messages or SI messages can be delivered to the remote UE in one same multicast message. For example, if remote UE 1 requests an SI message 1 and an SI message 2, and remote UE 2 requests the SI message 2 and an SI message 3, the SI message 1, the SI message 2, and the SI message 3 may be grouped into one group. If the relay UE finds that the remote UE no longer simultaneously requests the SI message 1 and the SI message 2 or the SI message 2 and the SI message 3 after a period of time, the relay UE correspondingly updates the group and the mapping relationship.

With reference to the first aspect and the foregoing embodiments, in some embodiments, when the M SIBs or SI messages correspond to the same destination identifier, the destination identifier is a preset identifier.

With reference to the first aspect and the foregoing embodiments, in some embodiments, when the M SIBs or SI messages correspond to the same destination identifier, the second message further includes an identifier of the first terminal device.

For example, a broadcast identifier L2ID used for broadcast sending may be assigned to all remote UEs connected to the relay UE. In this manner, the relay UE sends a broadcast message to all the remote UEs by using the same broadcast identifier L2ID. Correspondingly, the remote UE receives the broadcast message of the relay UE by using the broadcast identifier L2ID. The broadcast message may include the M SIBs or SI messages requested by the one or more remote UEs.

In the foregoing embodiments, the relay UE may send the SI message or the SIB to the one or more remote UEs in the broadcast message manner. When a plurality of remote UEs request to obtain the system information from the relay UE, the relay UE does not occupy more SL resources to send the system information to the plurality of remote UEs through unicast communication. This saves the communication resource.

With reference to the first aspect and the foregoing embodiments, in some embodiments, the method further includes:

The first terminal device sends information about a first mapping relationship to the one or more second terminal devices. The first mapping relationship indicates a correspondence between the M SIBs or SI messages and the N destination identifiers.

With reference to the first aspect and the foregoing embodiments, in some embodiments, the method further includes:

When the first mapping relationship changes, the first terminal device sends information about an updated first mapping relationship to the second terminal device; and/or when a third terminal device accesses the first terminal device, the first terminal device sends the information about the first mapping relationship to the third terminal device.

Optionally, when the remote UE establishes a connection to the relay UE, the relay UE may directly send the first mapping relationship to the remote UE. Alternatively, when the remote UE receives the first request message sent by the relay UE, the relay UE may directly send the first mapping relationship to the remote UE. This is not limited in embodiments of this application.

Alternatively, in a possible case, when the first mapping relationship changes, the first terminal device sends the information about the updated first mapping relationship to the second terminal device.

Alternatively, in another possible case, when new remote UE (for example, the third terminal device) accesses the relay UE, the relay UE may send the information about the first mapping relationship to the new remote UE (for example, the third terminal device).

With reference to the first aspect and the foregoing embodiments, in some embodiments, after the first terminal device determines N destination identifiers corresponding to the M SIBs or SI messages, the method further includes: The first terminal device sends, to the one or more second terminal devices, information about a destination identifier corresponding to the second message. The destination identifier is determined by the first terminal device based on a first mapping relationship. The first mapping relationship indicates a correspondence between the M SIBs or SI messages and the N destination identifiers.

In the foregoing manner, when the remote UE requests to obtain the SI from the relay UE in the on-demand manner, the relay UE may deliver the SI to the remote UE in the multicast manner. The remote UE may group the M SI messages that the relay UE requests to obtain into N groups, and assign one multicast identifier L2ID to each group. The relay UE may notify the remote UE of a multicast identifier L2ID corresponding to a currently requested SI message, or notify the remote UE of a correspondence between the SI message and the multicast identifier, or notify the remote UE of a correspondence between the SIB and the multicast identifier. In this way, the remote UE receives the requested SI by using the multicast identifier L2ID corresponding to each group of SI messages.

With reference to the first aspect and the foregoing embodiments, in some embodiments, before the first terminal device sends a second message to the one or more second terminal devices in a broadcast or multicast manner, the method further includes: The first terminal device receives the M SIBs or SI messages periodically broadcast by a network device; and/or the first terminal device sends the first request message to the network device; and the first terminal device receives the M SIBs or SI messages sent by the network device.

With reference to the first aspect and the foregoing embodiments, in some embodiments, that the first terminal device sends a second message to the one or more second terminal devices in a broadcast or multicast manner includes:

The first terminal device periodically sends the second message to the one or more second terminal devices.

Optionally, a multicast periodicity of the relay UE may be configured with reference to a periodicity in an SIB 1. For example, the multicast periodicity is determined with reference to a periodicity in SI-SchedulingInfo. Alternatively, the relay UE may reconfigure a multicast periodicity and notify the remote UE of the multicast periodicity. Alternatively, a multicast periodicity may be configured based on a new timer.

With reference to the first aspect and the foregoing embodiments, in some embodiments, the first request message is sent by using the radio resource control RRC signaling, the media access control MAC CE signaling, or the sidelink control information SCI.

With reference to the first aspect and the foregoing embodiments, in some embodiments, the method further includes: The first terminal device receives a feedback message sent by the one or more second terminal devices. The feedback message indicates whether the second message is successfully received. The first terminal device stops sending the second message.

It should be understood that, for different broadcast and multicast manners, a process of sending the feedback message may correspond to different implementation processes.

In an embodiment, if the first terminal device sends the second message to the one or more second terminal devices in the broadcast message manner, when the first terminal device receives feedback messages of all the one or more second terminal devices, and determines, based on the feedback messages, that all the one or more second terminal devices successfully receive the second message, the first terminal device stops sending the broadcast message.

In another embodiment, if the first terminal device sends the second message to the one or more second terminal devices in the multicast message manner, because different groups send different multicast messages (for example, N groups send N different multicast messages), when the first terminal device receives feedback messages of all the second terminal devices to which each group correspondingly sends the first request message, and determines, based on the feedback messages, that all the second terminal devices to which each group correspondingly sends the first request message successfully receive the second message, the first terminal device stops sending the multicast message.

Optionally, in the method, a quantity of times that the first terminal device sends the broadcast message and the multicast message to the second terminal device may be preset. For example, the relay UE may send the multicast message or the broadcast message to the one or more remote UEs for only three times, and then stop sending. This is not limited in embodiments of this application.

According to a second aspect, an information transmission method is provided. The method is applied to a system including a first terminal device and one or more second terminal devices. The first terminal device establishes a sidelink (SL) connection to each second terminal device, and each second terminal device obtains a network service of a target cell through the first terminal device. The target cell is a serving cell of the first terminal device. The method includes:

The one or more second terminal devices send a first request message to the first terminal device. The first request message is used to request to obtain M system information blocks SIBs or system information SI messages of the target cell.

The one or more second terminal devices receive a second message sent by the first terminal device in a broadcast or multicast manner. The second message includes the M SIBs or SI messages. The M SIBs or SI messages correspond to N destination identifiers, and the second message includes the corresponding destination identifiers, where N is an integer greater than or equal to 1, and N≤M.

With reference to the second aspect, in some embodiments, the M SIBs or SI messages correspond to one same destination identifier. The destination identifier indicates the first terminal device to send the M SIBs or SI messages in the broadcast manner.

Alternatively, each of the M SIBs or SI messages corresponds to a different destination identifier. The destination identifier indicates the first terminal device to send the M SIBs or SI messages in the multicast manner.

Alternatively, K SIBs or SI messages of the M SIBs or SI messages correspond to one same destination identifier, where 1≤K<M. The destination identifier indicates the first terminal device to send the M SIBs or SI messages in the multicast manner.

With reference to the second aspect and the foregoing embodiments, in some embodiments, when the M SIBs or SI messages correspond to the same destination identifier, the destination identifier is a preset identifier.

With reference to the second aspect and the foregoing embodiments, in some embodiments, when the M SIBs or SI messages correspond to the same destination identifier, the second message further includes an identifier of the first terminal device. The method further includes:

The one or more second terminal devices receive the second message that includes the identifier of the first terminal device and that is sent by the first terminal device.

A corresponding SIB or SI message is obtained based on the second message.

With reference to the second aspect and the foregoing embodiments, in some embodiments, the method further includes:

The one or more second terminal devices receive information that is about a first mapping relationship and that is sent by the first terminal device. The first mapping relationship indicates a correspondence between the M SIBs or SI messages and the N destination identifiers.

The one or more second terminal devices determine, based on the information about the first mapping relationship, a destination identifier used for receiving the second message sent by the first terminal device.

The one or more second terminal devices receive the second message that includes the destination identifier and that is sent by the first terminal device.

A corresponding SIB or SI message is obtained based on the second message.

With reference to the second aspect and the foregoing embodiments, in some embodiments, the method further includes: When the first mapping relationship changes, the one or more second terminal devices receive information that is about an updated first mapping relationship and that is sent by the first terminal device; and/or when a third terminal device accesses the first terminal device, the first terminal device sends the information about the first mapping relationship to the third terminal device.

With reference to the second aspect and the foregoing embodiments, in some embodiments, the method further includes: The one or more second terminal devices receive information that is about a destination identifier corresponding to the second message and that is sent by the first terminal device. The destination identifier is determined by the first terminal device based on a first mapping relationship. The first mapping relationship indicates a correspondence between the M SIBs or SI messages and the N destination identifiers.

With reference to the second aspect and the foregoing embodiments, in some embodiments, that the one or more second terminal devices receive the M SIBs or SI messages sent by the first terminal device in a broadcast or multicast manner includes: The one or more second terminal devices periodically receive the M SIBs or SI messages sent by the first terminal device in the broadcast or multicast manner.

With reference to the second aspect and the foregoing embodiments, in some embodiments, the first request message is sent by using radio resource control RRC signaling, media access control MAC CE signaling, or sidelink control information SCI.

With reference to the second aspect and the foregoing embodiments, in some posible embodiments, the method further includes: The one or more second terminal devices send a feedback message to the first terminal device. The feedback message indicates whether the second message is successfully received. The one or more second terminal devices stop receiving the second message sent by the first terminal device.

According to a third aspect, an information transmission apparatus is provided. The apparatus establishes a sidelink (SL) connection to each of one or more second terminal devices. Each second terminal device obtains a network service of a target cell through the apparatus. The target cell is a serving cell of the apparatus. The apparatus includes:

a communication unit, configured to receive a first request message sent by the one or more second terminal devices, where the first request message is used to request to obtain M system information blocks SIBs or system information SI messages of the target cell; and a determining unit, configured to determine N destination identifiers corresponding to the M SIBs or SI messages, where N is an integer greater than or equal to 1, and N≤M.

The communication unit is further configured to send a second message to the one or more second terminal devices in a broadcast or multicast manner. The second message includes the M SIBs or SI messages, and the second message includes the corresponding destination identifiers.

With reference to the third aspect, in some embodiments, the determining unit is further configured to determine that the M SIBs or SI messages correspond to one same destination identifier. The destination identifier indicates to send the M SIBs or SI messages in the broadcast manner.

Alternatively, the determining unit is further configured to determine that each of the M SIBs or SI messages corresponds to a different destination identifier. The destination identifier indicates to send the M SIBs or SI messages in the multicast manner.

Alternatively, the determining unit is further configured to determine that K SIBs or SI messages of the M SIBs or SI messages correspond to one same destination identifier, where 1≤K<M. The destination identifier indicates to send the M SIBs or SI messages in the multicast manner.

With reference to the third aspect and the foregoing embodiments, in some embodiments, when the M SIBs or SI messages correspond to the same destination identifier, the destination identifier is a preset identifier.

With reference to the third aspect and the foregoing embodiments, in some embodiments, when the M SIBs or SI messages correspond to the same destination identifier, the second message further includes a device identifier of the apparatus.

With reference to the third aspect and the foregoing embodiments, in some embodiments, the communication unit is further configured to send information about a first mapping relationship to the one or more second terminal devices. The first mapping relationship indicates a correspondence between the M SIBs or SI messages and the N destination identifiers.

With reference to the third aspect and the foregoing embodiments, in some embodiments, when the first mapping relationship changes, the communication unit is further configured to send information about an updated first mapping relationship to the second terminal device; and/or when a third terminal device accesses the apparatus, the communication unit is further configured to send the information about the first mapping relationship to the third terminal device.

With reference to the third aspect and the foregoing embodiments, in some embodiments, after the determining unit determines the N destination identifiers corresponding to the M SIBs or SI messages, the communication unit is further configured to send, to the one or more second terminal devices, information about a destination identifier corresponding to the second message. The destination identifier is determined by the apparatus based on a first mapping relationship. The first mapping relationship indicates a correspondence between the M SIBs or SI messages and the N destination identifiers.

With reference to the third aspect and the foregoing embodiments, in some embodiments, before the communication unit sends a second message to the one or more second terminal devices in a broadcast or multicast manner, the communication unit is further configured to receive the M SIBs or SI messages periodically broadcast by a network device; and/or the communication unit is further configured to:

send the first request message to the network device; and receive the M SIBs or SI messages sent by the network device.

With reference to the third aspect and the foregoing embodiments, in some embodiments, the communication unit is further configured to periodically send the second message to the one or more second terminal devices.

With reference to the third aspect and the foregoing embodiments, in some embodiments, the first request message is sent by using radio resource control RRC signaling, media access control MAC CE signaling, or sidelink control information SCI.

With reference to the third aspect and the foregoing embodiments, in some embodiments, the communication unit is further configured to receive a feedback message sent by the one or more second terminal devices. The feedback message indicates whether the second message is successfully received.

The determining unit is further configured to stop sending the second message.

According to a fourth aspect, an information transmission apparatus is provided. Each of one or more apparatuses establishes a sidelink (SL) connection to a first terminal device. Each apparatus obtains a network service of a target cell through the first terminal device. The target cell is a serving cell of the first terminal device. The apparatus includes:

a communication unit, configured to send a first request message to the first terminal device. The first request message is used to request to obtain M system information blocks (SIBs) or system information (SI) messages of the target cell.

The communication unit is further configured to receive a second message sent by the first terminal device in a broadcast or multicast manner. The second message includes the M SIBs or SI messages. The M SIBs or SI messages correspond to N destination identifiers, and the second message includes the corresponding destination identifiers, where N is an integer greater than or equal to 1, and N≤M.

With reference to the fourth aspect, in some embodiments, the M SIBs or SI messages correspond to one same destination identifier. The destination identifier indicates the first terminal device to send the M SIBs or SI messages in the broadcast manner.

Alternatively, each of the M SIBs or SI messages corresponds to a different destination identifier. The destination identifier indicates the first terminal device to send the M SIBs or SI messages in the multicast manner.

Alternatively, K SIBs or SI messages of the M SIBs or SI messages correspond to one same destination identifier, where 1≤K<M. The destination identifier indicates the first terminal device to send the M SIBs or SI messages in the multicast manner.

With reference to the fourth aspect and the foregoing embodiments, in some embodiments, when the M SIBs or SI messages correspond to the same destination identifier, the destination identifier is a preset identifier.

With reference to the fourth aspect and the foregoing embodiments, in some embodiments, when the M SIBs or SI messages correspond to the same destination identifier, the second message further includes an identifier of the first terminal device, and the communication unit is further configured to receive the second message that includes the identifier of the first terminal device and that is sent by the first terminal device.

The determining unit is further configured to obtain, based on the second message, a corresponding SIB or SI message.

With reference to the fourth aspect and the foregoing embodiments, in some embodiments, the communication unit is further configured to receive information that is about a first mapping relationship and that is sent by the first terminal device. The first mapping relationship indicates a correspondence between the M SIBs or SI messages and the N destination identifiers.

The determining unit is further configured to determine, based on the information about the first mapping relationship, a destination identifier used for receiving the second message sent by the first terminal device.

The communication unit is further configured to receive the second message that includes the destination identifier and that is sent by the first terminal device.

The determining unit is further configured to obtain, based on the second message, a corresponding SIB or SI message.

With reference to the fourth aspect and the foregoing embodiments, in some embodiments, when the first mapping relationship changes, the communication unit is further configured to receive information that is about an updated first mapping relationship and that is sent by the first terminal device; and/or when a third terminal device accesses the first terminal device, the communication unit is further configured to send the information about the first mapping relationship to the third terminal device.

With reference to the fourth aspect and the foregoing embodiments, in some embodiments, the communication unit is further configured to receive information about a destination identifier that corresponds to the second message and that is sent by the first terminal device. The destination identifier is determined by the first terminal device based on a first mapping relationship. The first mapping relationship indicates a correspondence between the M SIBs or SI messages and the N destination identifiers.

With reference to the fourth aspect and the foregoing embodiments, in some embodiments, that the communication unit is further configured to receive the M SIBs or SI messages sent by the first terminal device in a broadcast or multicast manner includes:

The communication unit is further configured to periodically receive the M SIBs or SI messages sent by the first terminal device in the broadcast or multicast manner.

With reference to the fourth aspect and the foregoing embodiments, in some embodiments, the first request message is sent by using radio resource control RRC signaling, media access control MAC CE signaling, or sidelink control information SCI.

With reference to the fourth aspect and the foregoing embodiments, in some embodiments, the communication unit is further configured to send a feedback message to the first terminal device. The feedback message indicates whether each apparatus successfully receives the second message.

The determining unit is further configured to stop receiving the second message sent by the first terminal device.

According to a fifth aspect, an apparatus is provided. The communication apparatus has functions of implementing the first terminal device in the method design of the first aspect. These functions may be implemented by hardware, or may be implemented by hardware executing corresponding software. The hardware or the software includes one or more units corresponding to the foregoing functions.

According to a sixth aspect, an apparatus is provided. The communication apparatus has functions of implementing the second terminal device in the method design of the second aspect. These functions may be implemented by hardware, or may be implemented by hardware executing corresponding software. The hardware or the software includes one or more units corresponding to the foregoing functions.

According to a seventh aspect, a terminal device is provided, including a transceiver and a processor. Optionally, the terminal device further includes a memory. The processor is configured to control the transceiver to receive or send a signal. The memory is configured to store a computer program. The processor is configured to invoke the computer program from the memory and run the computer program, to enable the terminal device to perform the method according to the first aspect or any one of the embodiments of the first aspect, or the method according to the second aspect or any one of the embodiments of the second aspect.

According to an eighth aspect, a network device is provided, including a transceiver and a processor. Optionally, the network device further includes a memory. The processor is configured to control the transceiver to receive or send a signal. The memory is configured to store a computer program. The processor is configured to invoke the computer program from the memory and run the computer program, to enable the network device to perform the steps performed by the network device according to any one of the embodiments of the first aspect or the second aspect.

According to a ninth aspect, a communication system is provided. The system includes the first terminal device of the third aspect and the second terminal device of the fourth aspect. The system may further include the network device of the eighth aspect.

According to a tenth aspect, a communication apparatus is provided. The communication apparatus may be the terminal device in the foregoing method design or a chip disposed in the terminal device. The communication apparatus includes a processor coupled to a memory. The processor may be configured to execute instructions in the memory, to implement the method performed by the first terminal device according to the first aspect or any one of the embodiments of the first aspect, or the method performed by the second terminal device according to the second aspect or any one of the embodiments of the second aspect. Optionally, the communication apparatus further includes the memory. Optionally, the communication apparatus further includes a communication interface, and the processor is coupled to the communication interface.

When the communication apparatus is the terminal device, the communication interface may be a transceiver or an input/output interface.

When the communication apparatus is the chip disposed in the terminal device, the communication interface may be an input/output interface.

Optionally, the transceiver may be a transceiver circuit. Optionally, the input/output interface may be an input/output circuit.

According to an eleventh aspect, a communication apparatus is provided. The communication apparatus may be the network device in the foregoing method design or a chip disposed in the network device. The communication apparatus includes a processor coupled to a memory. The processor may be configured to execute instructions in the memory, to implement the method performed by the network device according to any one of the embodiments of the first aspect or the second aspect. Optionally, the communication apparatus further includes the memory. Optionally, the communication apparatus further includes a communication interface. The processor is coupled to the communication interface.

When the communication apparatus is the network device, the communication interface may be a transceiver or an input/output interface.

When the communication apparatus is the chip disposed in the network device, the communication interface may be an input/output interface.

Optionally, the transceiver may be a transceiver circuit. Optionally, the input/output interface may be an input/output circuit.

According to a twelfth aspect, a computer program product is provided. The computer program product includes computer program code. When the computer program code is run on a computer, the computer is enabled to perform the methods in the foregoing aspects.

According to a thirteenth aspect, a computer-readable medium is provided. The computer-readable medium stores program code. When the computer program code is run on a computer, the computer is enabled to perform the methods in the foregoing aspects.

DESCRIPTION OF EMBODIMENTS

The following describes technical solutions of this application with reference to accompanying drawings.

It should be understood that division of manners, cases, types, and embodiments in embodiments of this application are only for ease of description, but should not constitute a special limitation, and features in various manners, types, cases, and embodiments may be combined when there is no contradiction.

It should be further understood that the terms "first", "second", and "third" in embodiments of this application are only used for distinguishing, and should not be construed as any limitation on this application. For example, "first terminal device", "second terminal device", "third terminal device", and the like in embodiments of this application represent different terminal devices in a mobile communication system.

It should be further understood that sequence numbers of processes do not mean execution sequences in various embodiments of this application. The execution sequences of the processes should be determined based on functions and internal logic of the processes, and should not be construed as any limitation on implementation processes of embodiments of this application.

It should be further noted that in embodiments of this application, "presetting" or "predefining" may be implemented by prestoring corresponding code or a corresponding table in a device (for example, including a terminal device and a network device), or in another manner that may indicate related information. A specific implementation of "presetting", "predefining", or the like is not limited in this application, for example, a preset identifier in embodiments of this application.

It should be further noted that, in embodiments of this application, "feedback information" may also be referred to as a "negative acknowledgment (NACK)", an "acknowledgement (ACK)", other information, or the like. This is not limited in embodiments of this application.

It should be further noted that "and/or" describes an association relationship between associated objects and represents that three relationships may exist. For example, A and/or B may represent the following three cases: Only A exists, both A and B exist, and only B exists. The character "/" generally indicates an "or" relationship between the associated objects. The following describes in detail the technical solutions provided by this application with reference to the accompanying drawings.

The technical solutions in embodiments of this application may be applied to various communication systems, for example, a long term evolution (LTE) system, an LTE frequency division duplex (FDD) system, an LTE time division duplex (TDD) system, a 5th generation (5G) mobile communication system or a new radio (NR) communication system, a future mobile communication system, and the like.

Figure 1:
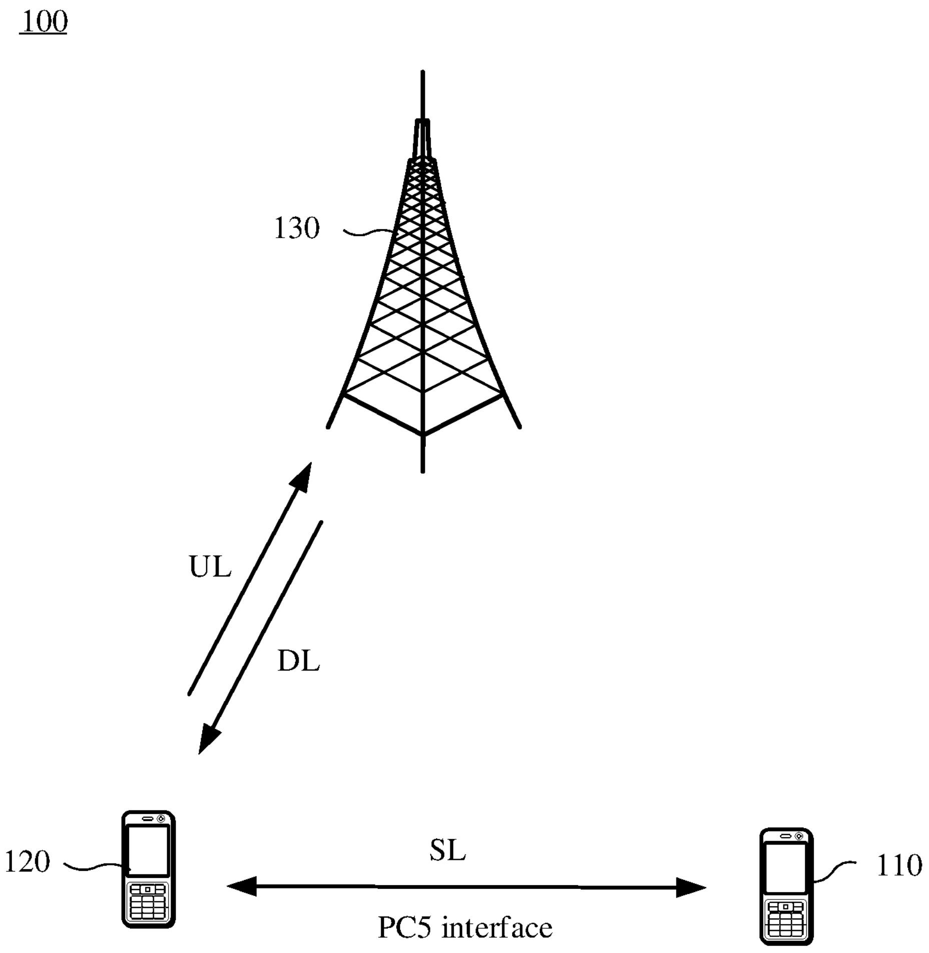
FIG. 1 is a schematic diagram of an architecture of a mobile communication system applicable to an embodiment of this application.

FIG. 1 is a schematic diagram of an architecture of a mobile communication system applicable to an embodiment of this application. As shown in FIG. 1, a wireless communication system 100 may include at least two terminal devices (for example, a terminal device 110 and a terminal device 120), a radio access network device 130, and the like. The terminal device 120 may be connected to the radio access network device 130 in a radio access manner. The terminal device 110 and the terminal device 120 may be devices at fixed locations, or may be mobile devices.

In the wireless communication system 100, the radio access network device 130 is an access device through which the terminal device 120 accesses the mobile communication system in a wireless manner. The radio access network device 130 may be a base station, an evolved NodeB (eNB), a home base station, an access point (AP) in a wireless fidelity (Wi-Fi) system, a wireless relay node, a wireless backhaul node, a transmission point (TP), or a transmission and reception point (TRP), or the like, or may be a gNB in an NR system, or may be a component or a part of devices of a base station, such as a central unit (CU), a distributed unit (DU), or a baseband unit (BBU), or the like. A specific technology and a specific device form used by the radio access network device 130 are not limited in this embodiment of this application.

In some deployments, the gNB may include a central unit (CU) and a distributed unit (DU). The gNB may further include an active antenna unit (AAU). The CU performs some functions of the gNB. The DU performs some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and functions related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified as a network device in a radio access network (RAN), or the CU may be classified as a network device in a core network (CN). This is not limited in this application.

It should be understood that the radio access network device 130 may be briefly referred to as a "network device". Unless otherwise specified, in this embodiment of this application, the network device is a radio access network device. In this embodiment of this application, the network device may be a network device, or may be a chip used in the network device to complete a wireless communication processing function.

The terminal device 110 and the terminal device 120 in the wireless communication system 100 may also be referred to as a terminal, user equipment (UE), a mobile station (MS), a mobile terminal (MT), and the like. The terminal device in this embodiment of this application may be a mobile phone, a tablet computer (Pad), or a computer with a wireless transceiver function, or may be a wireless terminal used in scenarios such as virtual reality (VR), augmented reality (AR), industrial control, self-driving, remote medical, a smart grid, transportation safety, a smart city, and a smart home. In this application, the terminal device and a chip that can be used in the terminal device are collectively referred to as a terminal device. It should be understood that a specific technology and a specific device form used by the terminal device are not limited in this embodiment of this application.

It should be further understood that FIG. 1 is only a schematic diagram. The wireless communication system 100 may further include another network device, for example, may further include a core network device, a wireless relay device, and a wireless backhaul device that are not shown in FIG. 1. A quantity of devices included in the wireless communication system 100 and a device type are not limited in embodiments of this application.

As shown in FIG. 1, in the wireless communication system 100, the terminal device 120 and the network device 130 may communicate with each other through a Uu interface. A link used to carry uplink control information and/or uplink data is referred to as an uplink (UL). For example, a physical uplink channel may include a physical uplink control channel (PUCCH) defined in an LTE protocol or an NR protocol, a physical uplink shared channel (PUSCH), and another uplink channel that is defined with network evolution and that has the foregoing function. A link used to carry downlink control information and/or downlink data is referred to as a downlink (DL). For example, a physical downlink channel may include a physical downlink control channel (PDCCH), a physical uplink shared channel (PDSCH), and another downlink channel that is defined with network evolution and that has the foregoing function. This is not limited in this embodiment of this application.

In addition, data communication may further be performed between the terminal device 110 and the terminal device 120 in the wireless communication system 100. To be specific, data communication may be directly performed between the terminal device 110 and the terminal device 120 without using the network device. For example, an interface between the terminal device 110 and the terminal device 120 is referred to as a PC5 interface, and a link between the terminal device 110 and the terminal device 120 is referred to as a sidelink (SL).

The foregoing wireless communication system 100 that includes the radio access network device 130, the terminal device 120, and the terminal device 110 may be referred to as a "UE-to-Network relay" system, the terminal device 120 may be referred to as "relay UE", and the terminal device 110 may be referred to as "remote UE". The base station is used as the radio access network device 130. A connection is established between the base station and the terminal device 120. An SL connection is established between the terminal device 120 and the terminal device 110. The terminal device 120 may help the terminal device 110 access the base station to obtain a network service. A downlink communication process is used as an example. The terminal device 120 may forward, to the terminal device 110, data obtained from the base station. An uplink communication process is used as an example. The terminal device 120 may obtain data from the terminal device 110, and then forward the data to the base station. This technology can improve cell coverage. Alternatively, the terminal device 110 may camp on, through the terminal device 120, a target cell that the radio access network device 130 includes, and has no data service.

In a possible application scenario, a vehicle to everything (V2X) system (or referred to as an Internet of Vehicles system) is a typical "UE-to-Network relay" system. For example, V2X is a next-generation information communication technology that connects a vehicle to everything. V represents a vehicle, and X represents any object that exchanges information with the vehicle, for example, a vehicle, a person, a roadside infrastructure, and a network. V2X is one of the fields with largest industrial potential and clearest market requirements in an Internet of Things system, and has features of wide application space, large industrial potential, and strong social benefits. An Internet of Vehicles collects vehicle information through devices such as a vehicle-mounted sensor and a vehicle-mounted terminal, and implements vehicle-to-vehicle (V2V) communication, vehicle-to-pedestrian (V2P) communication, vehicle-to-infrastructure (V2I) communication, and vehicle-to-network (V2N) communication by using a V2X communication technology. The Internet of Vehicles will become a basic part of an intelligent transportation system in the future.

In a V2X service, each vehicle may be understood as one terminal device, and may be referred to as "V2X UE". NR communication is used as an example. An NR PC5 interface is a direct communication interface between V2X UEs. For example, as shown in FIG. 1, both the terminal device 110 and the terminal device 120 may be used as the "V2X UE". A direct communication link between the terminal device 110 and the terminal device 120 is an SL. Data transmission may be directly performed between the terminal device 110 and the terminal device 120 through the SL without needing a network. This can effectively reduce a communication delay.

In addition, for the V2X service, the wireless communication system 100 may further include a V2X application server and the like. The terminal device 120 may also send V2X-related data to the base station 130 through an NR Uu interface. Then, the base station 130 sends the V2X-related data to the V2X application server for processing, and forwards processed data to the terminal device 110 of a receiver through the terminal device 120. This is not limited in this embodiment of this application.

It should be understood that, in addition to the foregoing V2X scenario, this embodiment of this application may be further applied to more other device to device (D2D) data transmission. The application scenario is not limited in this embodiment of this application.

It should be further understood that communication may be performed in a broadcast, unicast, or multicast manner on the SL between the terminal device 110 (remote UE) and the terminal device 120 (relay UE).

In a broadcast communication process, the terminal device 120 may send unencrypted data of a broadcast service to the outside. The terminal device 120 may be used as transmitting equipment (TX). Any other terminal device within an effective receiving range of the terminal device 120 may be used as receiving equipment (RX), for example, the terminal device 110. If the terminal device is interested in the broadcast service, the terminal device may receive the data of the broadcast service.

In unicast communication, a unicast connection needs to be first established between two terminal devices (for example, the TX and the RX). After the unicast connection is established between the two terminal devices, data communication may be performed based on a negotiated identifier. The data may be encrypted or unencrypted. Compared with the broadcast communication, the unicast communication can be performed only between two terminal devices that establish a unicast connection. The unicast communication is similar to a data communication process performed after a radio resource control (radio resource control, RRC) connection is established between the terminal device and the network device. Details are not described herein again.

Multicast communication means communication between all terminal devices in a communication group. Any terminal device in the group may be used as the TX or the RX, to receive or send data of a multicast service. A terminal device that does not belong to the communication group does not receive and parse the data of the multicast service.

With reference to the wireless communication system 100 shown in FIG. 1, the following describes a system information (system information, SI) transmission method in the system 100. For ease of understanding, the following first describes several concepts related to transmission of the SI.

1. System Information (SI)

The SI may be generally broadcast by a base station to a terminal device. The SI includes minimum system information (MSI) and other system information (OSI). The MSI includes a master information block (MIB) of basic information for initial access and scheduling information of a system information block 1 (SIB 1). The SIB 1 may also be referred to as remaining minimum SI (RMSI).

The MIB defines most basic system information of a cell and a parameter required for decoding the SIB 1. The MIB is transmitted on a physical broadcast channel (PBCH). The SIB 1 includes some parameters required for random access, for example, a cell selection parameter, an access control parameter, channel configuration information related to the initial access, system message request configuration information, and a scheduling configuration of another system message, that is, the SIB 1 includes scheduling information of another SIB. For a cell in which the SIB 1 is not broadcast, the terminal device cannot camp on the cell.

In NR, a scheduling periodicity of the MSI is fixed. A periodicity of the MIB is 80 milliseconds (ms). A periodicity of the SIB 1 is 160 ms.

2. Scheduling of OSI

The OSI includes all SIBs other than the MSI, namely, an SIB 2 to an SIB n, and is carried on a physical downlink control channel (PDSCH). The OSI supports a periodic broadcast, and mainly includes a cell reselection parameter, a public safety parameter, and the like.

The scheduling of the OSI is performed in a unit of a system information message (SI message). Each SI message includes one or more SIBs that have a same scheduling requirement other than the SIB 1. All SIBs included in one SI message have a same transmission periodicity. Table 1 shows a possible mapping relationship between the SI message and the SIB. The mapping relationship between the SI message and the SIB is included in the SIB 1, and is indicated in an information element SI-SchedulingInfo. The information element SI-SchedulingInfo includes a plurality of SchedulingInfos, and each SchedulingInfo includes one mapping relationship between the SI message and the SIB. For example, as shown in Table 1, a SchedulingInfo 1 indicates that the SIB 2 and an SIB 3 are mapped to an SI message 1; a SchedulingInfo 2 indicates that an SIB 4 and an SIB 5 are mapped to an SI message 2; and a SchedulingInfo 3 indicates that an SIB 6 and an SIB 7 are mapped to an SI message 3.

TABLE 1

| Information element | Information element content | Corresponding system message |
|---|---|---|
| SI-SchedulingInfo | SchedulingInfo 1 (SIB 2, SIB 3) | SI message 1 |
| | SchedulingInfo 2 (SIB 4, SIB 5) | SI message 2 |
| | SchedulingInfo 3 (SIB 6, SIB 7) | SI message 3 |

The mapping relationship between the SIB and the SI message follows the following rules:

(1) SIBs that have a same transmission periodicity may be mapped to a same SI message, or may be mapped to different SI messages, and each SIB is included in only one SI message.

(2) SIBs that have different transmission periodicities are mapped to different SI messages.

3. Transmission of OSI

There are two manners for transmitting the OSI: a broadcast scheduling manner and an "on-demand" manner. In the broadcast scheduling manner, the base station broadcasts the OSI in system information-windows (system information-windows, SI-windows), and each SI message is transmitted in only one SI-window. Specifically, the following rules are followed:

(1) One SI message can be associated with one SI-window, and only the SI message can be sent and the SI message can be repeatedly sent in the SI-window. A specific quantity of sending times and slots (slots) on which the SI message is sent may depend on implementation of the base station, but another SI message cannot be sent in one SI-window.

(2) The SI-windows are close to each other. Any two adjacent SI-windows do not overlap or have a gap.

(3) Lengths of SI-windows of all SI messages are the same.

(4) Periods of different SI messages are independent of each other.

(5) Each SI message includes at least one SIB. SIBs that have a same scheduling periodicity can be transmitted in one same SI message.

A gNB notifies, through the SIB 1, UE of SI messages, SIBs included in each SI message, an SI-window in which the SI messages are sent, and a time domain position and length of the SI-window. In addition, the gNB does not notify the UE of subframes of the SI-window in which the SI message is scheduled. When the UE needs an SIB, the UE attempts to decode downlink control information (DCI) by using a system information-radio network temporary identifier (SI-RNTI) in each subframe of an SI-window associated with an SI message corresponding to the SIB, until the SI message is successfully received. For example, scheduling from a start subframe of the SI-window other than a subframe of the SI, the UE attempts to decode the DCI in subframes whose number is SI-window Length.

In addition, the UE can also obtain the OSI in the on-demand manner, namely, on demand other system information (ODOSI). Whether to use the on-demand SI may be indicated by signaling SI-BroadcastStatus in the SchedulingInfo. notBroadcasting indicates that the on-demand SI is used.

Optionally, a communication process between the terminal device and the base station is used as an example. When the terminal device is in a radio resource control connected state (RRC CONNECT), the terminal device may request to obtain the OSI by using RRC dedicated signaling DedicatedSIBRequest. A minimum granularity of requesting is an SIB.

It should be understood that when the terminal device is in an idle state (RRC IDLE) or a non-connected state (RRC INACTIVE), if the SIB 1 indicates that the ODOSI is supported, and a field SI-SchedulingInfo includes SI-RequestConfig or SI-RequestConfigSUL, it indicates that the OSI may be obtained by using an on-demand process. In the field, a dedicated random access resource for an SI request is configured, including a correspondence between an SI and a preamble, that is, a preamble corresponding to a requested SI is selected when random access is sent. The RRC triggers a MAC layer to initiate an initial random access process by using PRACH preamble(s) and PRACH resource(s) included in an SI-RequestConfig message. In this case, the UE notifies, by using an Msg1, a network side to request the OSI.

If the SI-SchedulingInfo in the SIB 1 does not include the SI-RequestConfig or the SI RequestConfigSUL, the UE needs to trigger RRC signaling RRCSystemInfoRequest to notify the base station to obtain these system messages. The OSI is requested by using an MSG 3 (contention-based random access message 3).

After receiving a request message from the UE, the base station indicates, by using PDCCH DCI, the UE to perform receiving in a corresponding SI-window.

It should be further understood that SI transmission described in this embodiment of this application may be understood as a transmission process mainly for the OSI, namely, a process of transmitting the OSI between relay UE and remote UE in a "UE-to-Network relay" system.

Figure 2:
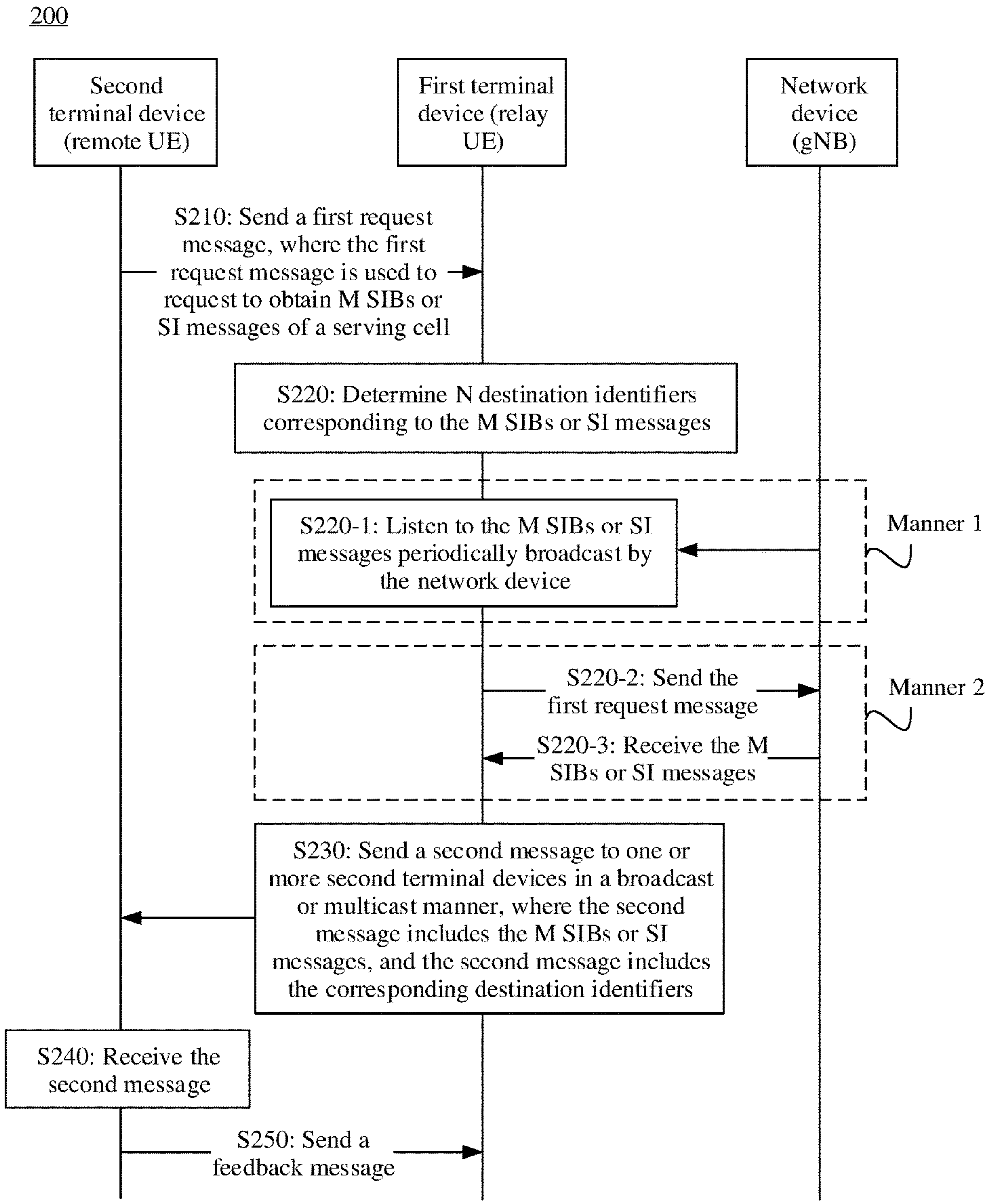
FIG. 2 is a schematic flowchart of a system information SI transmission method according to an embodiment of this application.

FIG. 2 is a schematic flowchart of a system information SI transmission method according to an embodiment of this application. The method 200 may be applied to the foregoing wireless communication system 100 including the first terminal device (relay UE), the second terminal device (remote UE), and the network device (base station). The first terminal device (relay UE) establishes a sidelink SL connection to one or more second terminal devices (remote UE), and each second terminal device obtains a network service of a target cell through the first terminal device. The target cell is a serving cell of the first terminal device. It should be understood that the second terminal device in this embodiment of this application may be in a connected state or a non-connected state.

As shown in FIG. 2, the method 200 includes the following content.

S210: The one or more second terminal devices send a first request message to the first terminal device, where the first request message is used to request to obtain M system information blocks SIBs or system information SI messages of the serving cell; and correspondingly, the first terminal device receives the first request message sent by the one or more second terminal devices.

It should be understood that the remote UE may send the first request message to the relay UE, to request to obtain SI required by the remote UE. Based on the foregoing description of the SI, the first request message may be used by one or more remote UEs to request required M SI messages, or the first request message may be used by one or more remote UEs to request required M SIBs. A system message requested by each remote UE may be one or more SI messages of the M SI messages, or a system message requested by each remote UE may be one or more SIBs of the M SIBs. This is not limited in this embodiment of this application.

In an embodiment, the first request message may be sent by using radio resource control RRC signaling, media access control (MAC)-control element (CE) signaling, sidelink control information (SCI), or PC5-S signaling on a sidelink. For example, the remote UE may send a system message request to the relay UE by using PC5-RRC signaling.

S220: The first terminal device determines N destination identifiers corresponding to the M SIBs or SI messages, where N is an integer greater than or equal to 1, and N≤M.

It should be understood that an SL connection is established between the remote UE and the relay UE, and the SL may support a broadcast, multicast, and unicast communication manner. The three communication manners are mainly implemented by using a source identifier (source layer-2 ID, SRC ID) and a destination identifier (destination layer-2 ID, DST ID) in an access stratum (AS), or the source identifier and the destination identifier are referred to as a "source address" and a "destination address".

Table 2 is a possible simplified message format. As shown in Table 2, a DST ID may be assigned according to different communication manners such as broadcast, multicast, and unicast on the SL. Optionally, the DST ID may be set to a destination identifier of the unicast, multicast, or broadcast, and is used for receiving by receiving equipment.

An SRC ID is used to identify an identity (ID) of transmitting equipment. Optionally, the SRC ID may be self-assigned by the terminal device. For example, for the relay UE, the SRC ID may be a device identifier of the relay UE, or a source L2ID used by the relay UE to perform unicast communication with the remote UE on the SL, or a source identifier specially assigned for multicast or broadcast of the system message.

A frame type is used to identify a type of a data frame. Optionally, content of the frame type may indicate that message content is a system message request.

TABLE 2

| SRC ID | DST ID | Frame type | Frame payload |
|---|---|---|---|

In this embodiment of this application, the "destination identifier" may be understood as a DST ID in a message, or referred to as a "DST L2ID". After receiving the first request message sent by the one or more remote UEs, the relay UE may parse content of the first request message, and accurately learn the M SI messages or the M SIBs required by all the remote UEs. Then, the relay UE determines, for the M SI messages or the M SIBs, different L2 IDs corresponding to the M SI messages or the M SIBs.

S230: The first terminal device sends a second message to the one or more second terminal devices in a broadcast or multicast manner, where the second message includes the M SIBs or SI messages, and the second message includes the corresponding destination identifiers.

Optionally, in this application, the second message may represent one message. For example, the second message is one broadcast message. To be specific, the broadcast message includes all the M SIBs or SI messages requested by the one or more second terminal devices.

Alternatively, the second message may represent a plurality of messages. For example, the second message corresponds to a plurality of multicast messages. To be specific, the plurality of multicast messages include all the M SIBs or SI messages requested by the one or more second terminal devices, each multicast message may include one or more SIBs or SI messages requested by a current second terminal device, and the SIB and the SI message included in each multicast message belong to one group, for example, an SIB 2 and an SIB 3 in Table 4, and for another example, an SI message 1 and an SI message 2 in Table 6.

In descriptions of subsequent embodiments, "sending the second message" and "sending the M SIBs or SI messages" represent a same meaning, to be specific, the first terminal device sends the requested SIB or SI message to the one or more second terminal devices in a manner of sending one or more messages. It should be understood that regardless of whether the second message is used as one message or corresponds to a plurality of different independent messages, the second message falls within the protection scope of this embodiment of this application. Details are not described subsequently.

S240: The one or more second terminal devices receive the second message sent by the first terminal device in the broadcast or multicast manner.

Optionally, the remote UE may receive the SI in a discontinuous reception (DRX) manner, and a listening occasion adapts to a sending periodicity of the relay UE, to save more energy.

Optionally, the "sending the M SIBs or SI messages" described in this embodiment of this application may be understood as that only all the M SIBs requested by a plurality of second terminal devices are broadcast as broadcast messages to the plurality of second terminal devices. Alternatively, the "sending the M SIBs or SI messages" may be understood as that the first terminal device directly broadcasts all SI broadcast by a gNB to the plurality of second terminal devices. In other words, in addition to the M SIBs or SI messages, the broadcast message sent by the first terminal device to the second terminal device may further include another SIB or SI message, and the another SIB or SI message may not be requested by the first request message. This is not limited in this embodiment of this application.

Optionally, in S240, the first terminal device may periodically send the M SIBs or SI messages to the one or more second terminal devices. Correspondingly, the one or more second terminal devices may periodically receive the M SIBs or SI messages sent by the first terminal device in the broadcast or multicast manner. It should be understood that the periodicity may be a periodicity agreed on by the first terminal device and the second terminal device. The periodicity may be determined by the first terminal device, and indicated to the second terminal device by using an RRC message, PC5-S signaling, or the like on a sidelink. This is not limited in this embodiment of this application.

In an embodiment, the M SIBs or SI messages may correspond to one same destination identifier. The destination identifier indicates the first terminal device to send the M SIBs or SI messages to the one or more second terminal devices in the broadcast manner.

For example, a broadcast identifier L2ID used for broadcast sending may be assigned to all remote UEs connected to the relay UE. In this manner, the relay UE sends a broadcast message to all the remote UEs by using the same broadcast identifier L2ID. Correspondingly, the remote UE receives the broadcast message of the relay UE by using the broadcast identifier L2ID. The broadcast message may include the M SIBs or the M SI messages requested by the one or more remote UEs.

Optionally, when the M SIBs or SI messages correspond to the same destination identifier, the destination identifier may be a preset identifier. For example, the M SIBs or SI messages correspond to one broadcast identifier L2ID, and the broadcast identifier L2ID may be specified in a protocol.

For example, when the relay UE broadcasts the system information including the M SIBs or the M SI messages, the system information carries the SRC ID and the DST ID, where the DST ID is the foregoing broadcast identifier L2ID specified in the protocol. Because the broadcast identifier L2ID is pre-specified in the protocol, the remote UE and the relay UE can receive a broadcast of the system information by using the L2ID. Therefore, the relay UE does not need to notify the remote UE of the broadcast identifier L2ID. When receiving the broadcast message, the remote UE may receive, based on the L2ID in the broadcast message, the system information including the M SIBs or the M SI messages.

Optionally, when the M SIBs or SI messages correspond to the same destination identifier, to be specific, the first terminal device sends the M SIBs or SI messages to the one or more second terminal devices in the broadcast manner, the M SIBs or SI messages further include an identifier of the first terminal device.

It should be understood that when the remote UE is in signal coverage of a plurality of relay UEs, the remote UE may receive broadcast messages sent by the plurality of surrounding relay UEs. To identify that the broadcast message is sent by the relay UE connected to the remote UE, the remote UE may further determine, based on SRC IDs carried in the plurality of received broadcast messages, that is, based on the SRC ID in a message structure listed in Table 2, whether the broadcast message is from the relay UE connected to the remote UE.

For example, when remote UE 1 receives five broadcast messages sent by five relay UEs, the remote UE 1 may obtain an SRC ID carried in each broadcast message. When the SRC ID is a device identifier of relay UE connected to the remote UE 1, the remote UE 1 determines that the broadcast message is required by the remote UE 1, and parses content of the broadcast message, to obtain requested M SIBs or SI messages.

The identifier of the first terminal device may be the device identifier of the relay UE, or the source L2ID used by the relay UE to perform unicast communication with the remote UE on the SL, or the source identifier specially assigned for multicast or broadcast of the system message. This is not limited in this embodiment of this application.

A V2X scenario is used as an example. In a specific implementation process of the broadcast manner, configuration of the broadcast identifier L2ID (for example, the DST ID) depends on a V2X service. The broadcast identifier L2ID may be preconfigured by an application layer (for example, a V2X layer) of the relay UE, or may be preconfigured by a V2X application server, or a packet control function (PCF) of a 5G core network may provide the relay UE with a mapping relationship between a V2X service type and the DST ID, and different broadcast identifiers L2IDs are preconfigured based on different service types. This is not limited in this embodiment of this application.

Optionally, the broadcast of the system message may be delivered in a form of Uu information transfer, to be specific, all AS messages (such as a paging message and an SI message) on a base station side are included in an RRC message of Uu information transfer in a form of an RRC container, and then are delivered to the remote UE based on the assigned broadcast identifier L2ID.

For example, in an example of the RRC container, it is assumed that the RRC container including the AS message is an AS-RRC-message. After receiving the AS-RRC-message, the relay UE includes the AS-RRC-message in UuInformationTransfer on the SL, and sends the UuInformation Transfer to the remote UE. The UuInformation Transfer may be a PC5-RRC message used to forward AS signaling on the SL. A possible form is:

```
UuInformationTransfer-IEs::=SEQUENCE{
  AS-RRC-Message OCTET STRING OPTIONAL,
}
```

In a possible case, the relay UE may already have the system information requested by the remote UE. For example, the relay UE already has the M SIBs or SI messages requested by the remote UE. In this case, the relay UE may directly send the system information including the M SIBs or SI messages to the remote UE in the foregoing broadcast message manner.

In another possible case, the relay UE may not include the system information requested by the remote UE. For example, the relay UE does not have the M SIBs or SI messages requested by the remote UE. In this case, the relay UE may obtain the M SIBs or SI messages in the following two manners. Therefore, before S230, the method 200 may further include steps corresponding to the following manner 1 and/or manner 2.

Manner 1

S220-1: The first terminal device receives the M SIBs or SI messages periodically broadcast by the network device.

For example, in the wireless communication system 100 shown in FIG. 1, the gNB may broadcast the SI to the relay UE based on a configuration of the information element SI-SchedulingInfo in the SIB 1. After receiving the first request message, the relay UE determines the requested M SIBs or SI messages, waits for the SI broadcast by the gNB, and then performs S230 until the M SIBs or SI messages are obtained. In this manner, the relay UE does not need to occupy an additional resource to request to obtain the SI from the network device. This can reduce signaling overheads.

Manner 2

S220-2: The first terminal device sends the first request message to the network device, and correspondingly, the network device receives the first request message.

S220-3: The network device sends the M SIBs or SI messages to the first terminal device based on the first request message, and correspondingly, the first terminal device receives the M SIBs or SI messages sent by the network device.

It should be understood that only one of or both methods in the manner 1 and the manner 2 may be used. For example, the remote UE requests an SI message 1, an SI message 2, and an SI message 3 from the relay UE, and the relay UE receives the SI message 2 periodically broadcast by the gNB, and may request only the SI message 1 and the SI message 3 from the gNB. This is not limited in this embodiment of this application.

Optionally, the "first request message" in S220-2 and S220-3 may be the first request message in S210, that is, the first request message is used to request the M SIBs or SI messages. Alternatively, both the "first request message" in S220-2 and S220-3 and the first request message in S210 are used to request the M SIBs or the SI messages, but may have different message forms, message structures, or the like. This is specifically determined based on specific implementation between the first terminal device and the network device. Alternatively, the "first request message" in S220-2 and S220-3 and the "first request message" in S210 are used to request different SIBs or SI messages. For example, the "first request message" in S210 is used to request the SI message 1, the SI message 2, and the SI message 3, and the "first request message" in S220-2 and S220-3 is used to request the SI message 1 and the SI message 3. This is not limited in this embodiment of this application.

For example, the relay UE may send the first request message to the gNB. Request content is the M SIBs or SI messages requested by the remote UE, or some messages in the M SIBs or SI messages (a remaining message is an existing SIB or SI message that the relay UE has). After receiving the first request message, the gNB delivers the requested SIB or SI message to the relay UE. Specifically, for S220-2 and S220-3 included in the manner 2, refer to an existing process of requesting the SI. For brevity, details are not described herein again.

Optionally, in a process in which the relay UE sends the requested M SIBs or SI messages to the remote UE in the broadcast manner, more other remote UEs may receive the broadcast message although the more other remote UEs do not request the broadcast message. In this case, the more other remote UEs may also receive the broadcast message, that is, directly receive the M SIBs or SI messages, and reserve the M SIBs or SI messages for subsequent use. This is not limited in this embodiment of this application.

In the foregoing embodiments, the relay UE may send the SI message or the SIB to the one or more remote UEs in a broadcast message manner. When a plurality of remote UEs request to obtain the system information from the relay UE, the relay UE does not occupy more SL resources to send the system information to the plurality of remote UEs through unicast communication. This saves a communication resource.

Alternatively, in still another possible implementation, in addition to the foregoing broadcast manner, the relay UE may further send the SI message or the SIB to the one or more remote UEs in the multicast manner. The relay UE may determine different multicast identifiers for the one or more remote UEs according to different rules or scenarios.

It should be understood that in a process in which the one or more remote UEs send a request to the relay UE, the one or more remote UEs may not simultaneously send the first request message. Optionally, a predetermined timer may be set for the relay UE. In each predetermined timer, or when each timer expires, the SI messages or SIBs that are requested by the one or more remote UEs and that are received before the timer expires are grouped. Details are not described subsequently.

Optionally, all the M SIBs or SI messages correspond to one same destination identifier. The destination identifier indicates the first terminal device to send the M SIBs or SI messages to the one or more second terminal devices in the multicast manner.

For example, the relay UE may group all the M SI messages into one group and assign a unique multicast identifier L2ID, that is, the M SI messages correspond to one multicast identifier L2ID, or group all the M SIBs into one group and assign a unique multicast identifier L2ID, that is, the M SIBs correspond to one multicast identifier L2ID. The multicast identifier L2ID may be assigned by an AS of the relay UE, or may be assigned by the V2X layer based on a service request of the AS, or may be selected by the AS from a plurality of L2IDs pre-provided by the V2X layer. This is not limited in this embodiment of this application. Table 3 lists multicast identifiers assigned in a possible multicast manner. As shown in Table 3, the SI message 1, the SI message 2, and the SI message 3 each correspond to one multicast identifier L2ID 1, or the SIB 2 to an SIB 7 each correspond to one multicast identifier L2ID 1.

TABLE 3

| Information element | Information element content | Corresponding system message | Multicast identifier |
|---|---|---|---|
| SI-SchedulingInfo | SchedulingInfo 1 (SIB 2, SIB 3) | SI message 1 | L2ID 1 |
| | SchedulingInfo 2 (SIB 4, SIB 5) | SI message 2 | |
| | SchedulingInfo 3 (SIB 6, SIB 7) | SI message 3 | |

In the foregoing manner, when the remote UE requests to obtain the SI from the relay UE in an on-demand manner, the relay UE may deliver the SI to the remote UE in the multicast manner. The remote UE may group all SI messages that the relay UE requests to obtain into one group, and assign one multicast identifier L2ID. The relay UE may notify the remote UE of the multicast identifier L2ID, so that the remote UE receives the SI by using the multicast identifier L2ID. The multicast identifier L2ID may be notified to the remote UE when the remote UE accesses the relay UE, or may be notified to the remote UE after the remote UE sends a first request to the relay UE.

Alternatively, optionally, each of the M SIBs or SI messages is used as one group. Each group corresponds to a different destination identifier. The destination identifier indicates the first terminal device to send the M SIBs or SI messages to the one or more second terminal devices in the multicast manner.

For example, the relay UE may group all the M SI messages into M groups and assign a unique multicast identifier L2ID to each group, that is, the M SI messages correspond to M multicast identifiers L2IDs, or group all the M SIBs into M groups and assign a unique multicast identifier L2ID to each group, that is, the M SIBs correspond to M multicast identifiers L2IDs. The multicast identifier L2ID may be assigned by the AS of the relay UE, or may be assigned by the application layer (for example, the V2X layer) based on the service request of the AS, or may be selected by the AS from the plurality of L2IDs pre-provided by the application layer. This is not limited in this embodiment of this application. Table 4 lists multicast identifiers assigned in a possible multicast manner. As shown in Table 4, the SI message 1 (the SIB 2 and the SIB 3) corresponds to one multicast identifier L2ID 1, the SI message 2 (the SIB 4 and the SIB 5) corresponds to one multicast identifier L2ID 2, and the SI message 3 (the SIB 6 and the SIB 7) corresponds to one multicast identifier L2ID 3.

TABLE 4

| Information element | Information element content | Corresponding system message | Multicast identifier |
|---|---|---|---|
| SI-SchedulingInfo | SchedulingInfo 1 (SIB 2, SIB 3) | SI message 1 | L2ID 1 |
| | SchedulingInfo 2 (SIB 4, SIB 5) | SI message 2 | L2ID 2 |
| | SchedulingInfo 3 (SIB 6, SIB 7) | SI message 3 | L2ID 3 |

In the foregoing manner, when the remote UE requests to obtain the SI from the relay UE in the on-demand manner, the relay UE may deliver the SI to the remote UE in the multicast manner. The remote UE may group the M SI messages that the relay UE requests to obtain into M groups, and assign one multicast identifier L2ID to each group. The relay UE may notify the remote UE of the multicast identifier L2ID of each group, or notify the remote UE of a correspondence between the SI message and the multicast identifier, or notify the remote UE of a correspondence between the SIB and the multicast identifier. In this way, the remote UE receives the SI by using the multicast identifier L2ID corresponding to each group of SI messages.

Alternatively, optionally, K SIBs or SI messages of the M SIBs or SI messages correspond to one same destination identifier, where $1 \le K < M$. The destination identifier indicates the first terminal device to send the M SIBs or SI messages to the one or more second terminal devices in the multicast manner.

For example, the relay UE may group all the M SI messages into N groups and assign a unique multicast identifier L2ID to each group, that is, the M SI messages correspond to N multicast identifiers L2IDs, or group all the M SIBs into N groups and assign a unique multicast identifier L2ID to each group, that is, the M SIBs correspond to N multicast identifiers L2IDs. Table 5 lists multicast identifiers assigned in a possible multicast manner. As shown in Table 5, the SI message 1 (the SIB 2 and the SIB 3) and the SI message 2 (the SIB 4 and the SIB 5) correspond to one multicast identifier L2ID 1, and the SI message 3 (the SIB 6 and the SIB 7) corresponds to one multicast identifier L2ID 3.

TABLE 5

| Information element | Information element content | Corresponding system message | Multicast identifier |
|---|---|---|---|
| SI-SchedulingInfo | SchedulingInfo 1 (SIB 2, SIB 3) | SI message 1 | L2ID 1 |
| | SchedulingInfo 2 (SIB 4, SIB 5) | SI message 2 | |
| | SchedulingInfo 3 (SIB 6, SIB 7) | SI message 3 | L2ID 3 |

In the foregoing manner, when the remote UE requests to obtain the SI from the relay UE in the on-demand manner, the relay UE may deliver the SI to the remote UE in the multicast manner. The remote UE may group the M SI messages that the relay UE requests to obtain into N groups, and assign one multicast identifier L2ID to each group. The relay UE may notify the remote UE of a multicast identifier L2ID corresponding to a currently requested SI message, or notify the remote UE of a correspondence between the SI message and the multicast identifier, or notify the remote UE of a correspondence between the SIB and the multicast identifier. In this way, the remote UE receives the requested SI by using the multicast identifier L2ID corresponding to each group of SI messages.

Alternatively, a principle for grouping the M SI messages or SIBs by the relay UE may be flexibly designed. Optionally, the relay UE may group a plurality of remote UEs that request a same SIB into one group, to reduce the SL resource required by the relay UE to send the multicast message and a size of the multicast message.

Optionally, the relay UE may further group the SI messages based on content of the SI messages. For example, the relay UE may group all system messages (namely, an SIB 12, an SIB 13, and an SIB 14 in a 5G system) related to a sidelink configuration into one group, and assign a corresponding L2ID.

Optionally, the base station may also perform grouping based on historical information about the system message request. For example, the base station may group, based on the historical information, system messages that are usually simultaneously requested into one group, and then notify the relay UE of group information. Then, the relay UE assigns L2IDs to different groups. Alternatively, the base station may assign L2IDs, and notify the relay UE of a correspondence between the group and the L2ID. Finally, the relay UE directly uses a mapping relationship configured by the base station.

In addition, the relay UE may further update a grouping manner based on a requirement. For example, SIB messages or SI messages simultaneously requested by the remote UE are grouped into one group as much as possible based on a system message request condition of the remote UE in a current or recent period of time, so that the SIB messages or SI messages can be delivered to the remote UE in one same multicast message. For example, if remote UE 1 requests the SI message 1 and the SI message 2, and remote UE 2 requests the SI message 2 and the SI message 3, the SI message 1, the SI message 2, and the SI message 3 may be grouped into one group. If the relay UE finds that the remote UE no longer simultaneously requests the SI message 1 and the SI message 2 or the SI message 2 and the SI message 3 after a period of time, the relay UE correspondingly updates the group and the mapping relationship.

For example, Table 6 lists multicast identifiers assigned in a possible multicast manner. As shown in Table 6, it is assumed that in a configuration of the gNB, a mapping relationship between the SIB and the SI message is: The SIB 2 and the SIB 3 correspond to the SI message 1, the SIB 4 and the SIB 5 correspond to the SI message 2, and the SIB 6 and the SIB 7 correspond to the SI message 3.

If the remote UE 1 requests the SIB 2 and the SIB 3, the remote UE 2 requests the SIB 3 and the SIB 4, remote UE 3 and remote UE 4 both request the SIB 6 and the SIB 7, and remote UE 5 requests the SIB 5. Based on the mapping relationship between the SIB and the SI message, the relay UE may group the SI message 1 and the SI message 2 into one group and assign the multicast identifier L2ID 1, and group the SI message 3 into another group and assign the multicast identifier L2ID 2.

TABLE 6

| remote UE(s) | SIB(s) | SI message | Multicast identifier |
|---|---|---|---|
| UE 1, UE 2, UE 5 | SIB 2, SIB 3, SIB 4, SIB 5 | SI message 1, SI message 2 | L2ID 1 |
| UE 3, UE 4 | SIB 6, SIB 7 | SI message 3 | L2ID 2 |

Alternatively, for example, the relay UE directly performs grouping in a unit of the SIB. Although the SI is sent, at a Uu interface, in a unit of the SI message, the SI may be directly sent, at a PC5 interface, in the unit of the SIB. Therefore, grouping may be directly performed by using the SIB as a granularity.

Table 6 is still used as an example. Because the remote UE 1 and the remote UE 2 have a same requirement for the SIB 3, and to meet a requirement of the remote UE 1 for the SIB 2 and a requirement of the remote UE 2 for the SIB 4, the relay UE may group the SIB 2, the SIB 3, and the SIB 4 into one group, and assign the multicast identifier. In addition, the SIB 4 and the SIB 5 are no longer mapped to one SI message, but the SIB 4 and the SIB 5 are grouped into two groups, and multicast identifiers are separately assigned. Finally, a grouping result of the relay UE may be shown in Table 7. Details are not described herein again.

TABLE 7

| remote UE(s) | SIB(s) | Multicast identifier |
|---|---|---|
| UE 1, UE 2 | SIB 2, SIB 3, SIB 4 | L2ID 1 |
| UE 3, UE 4 | SIB 6, SIB 7 | L2ID 2 |
| UE 5 | SIB 5 | L2ID 3 |

In the foregoing manner, when the remote UE requests to obtain the SI from the relay UE in the on-demand manner, the relay UE may deliver the SI to the remote UE in the multicast manner. The remote UE may flexibly perform grouping based on the M SI messages and the M SIBs that the one or more remote UEs request to obtain, a quantity of remote UEs, and the like, and assign one multicast identifier L2ID to each group. The relay UE may notify the remote UE of the multicast identifier L2ID of each group, or notify the remote UE of the correspondence between the SI message and the multicast identifier, or notify the remote UE of the correspondence between the SIB and the multicast identifier. In this way, the remote UE receives the SI by using the multicast identifier L2ID corresponding to each group of SI messages. This improves SI sending efficiency and SI update efficiency.

In an embodiment, that the first terminal device sends the M SIBs or SI messages to the one or more second terminal devices may be that the first terminal device periodically sends the M SIBs or SI messages to the one or more second terminal devices in the multicast manner.

Optionally, after obtaining, from the gNB, the M SIBs or SI messages requested by the remote UE, the relay UE may combine the M SIBs or SI messages requested by the remote UE into one message, for example, combine the M SIBs or SI messages into a new SI message, and send the message to the remote UE in the multicast manner.

Optionally, the relay UE may periodically send, to the remote UE in the multicast manner, the M SIBs or SI messages requested by the remote UE. A multicast periodicity may be configured by the relay UE, or may be configured and sent to the relay UE by the gNB, and is notified to the remote UE in the broadcast, multicast, or unicast manner. When periodically sending the multicast message, the relay UE may multicast only an obtained SIB or SI message requested by the remote UE. The relay UE continues to wait for the gNB to send some SIBs or SI messages that are not obtained and that are requested by the remote UE, and then multicasts the SIBs or SI messages in a subsequent periodicity. This is not limited in this embodiment of this application.

Optionally, for the multicast periodicity of the relay UE, refer to a periodicity configuration in the SIB 1. For example, the multicast periodicity is determined with reference to a periodicity in the SI-SchedulingInfo. Alternatively, the relay UE may reconfigure a multicast periodicity and notify the remote UE of the multicast periodicity. Alternatively, the multicast periodicity may be configured based on a new timer.

Optionally, the relay UE may immediately deliver the multicast message after obtaining the first request message sent by the remote UE.

In a possible case, the relay UE may already have the system information requested by the remote UE. For example, the relay UE already has the M SIBs or SI messages requested by the remote UE. In this case, the relay UE may directly send the system information including the M SIBs or SI messages to the remote UE in the foregoing broadcast message manner.

In another possible case, the relay UE may not include the system information requested by the remote UE. For example, the relay UE does not have the M SIBs or SI messages requested by the remote UE. In this case, the relay UE may obtain the M SIBs or SI messages in the following two manners. Before S230, the method 200 may further include S220-1 corresponding to the foregoing manner 1, and/or S220-2 and S220-3 corresponding to the foregoing manner 2. For details, refer to the foregoing related descriptions. For brevity, details are not described herein again.

In the foregoing manner, when the remote UE requests to obtain the SI from the relay UE in the on-demand manner, the relay UE may deliver the SI to the remote UE in the multicast manner. The remote UE may group all the M SI messages that the relay UE requests to obtain into N groups, and assign one multicast identifier L2ID to each group, so that the remote UE receives SI messages of different groups by using different multicast identifiers L2IDs.

For multicast, the application layer provides information about the multicast identifier, and the relay UE may convert the multicast identifier into the DST ID. If the information about the multicast identifier is not provided, the relay UE may determine the multicast identifier by using a mapping relationship between a service type and the DST ID in a broadcast mechanism.

Optionally, after determining the N destination identifiers corresponding to the M SIBs or SI messages, the first terminal device may send information about a first mapping relationship to the one or more second terminal devices. The first mapping relationship indicates a correspondence between the M SIBs or SI messages and the N destination identifiers. Correspondingly, the one or more second terminal devices receive the information that is about the first mapping relationship and that is sent by the first terminal device, and receive, based on the information about the first mapping relationship, the M SIBs or SI messages sent by the first terminal device.

For example, the first mapping relationship may be any correspondence between the SI message and the multicast identifier listed in Table 3 to Table 5, or the correspondence between the SIB and the multicast identifier. Details are not described herein again.

Optionally, when the remote UE establishes a connection to the relay UE, the relay UE may directly send the first mapping relationship to the remote UE. Alternatively, when the remote UE receives the first request message sent by the relay UE, the relay UE may directly send the first mapping relationship to the remote UE. This is not limited in this embodiment of this application.

Alternatively, in a possible case, when the first mapping relationship changes, the first terminal device sends information about an updated first mapping relationship to the second terminal device.

Alternatively, in another possible case, when new remote UE (for example, a third terminal device) accesses the relay UE, the relay UE may send the information about the first mapping relationship to the new remote UE (for example, the third terminal device).

Optionally, when the relay UE updates the first mapping relationship or receives an SI change indication indicating that the mapping relationship between the SI message and the SIB changes, the relay UE may directly send, to the remote UE, information about modifying the mapping relationship, information about updating the mapping relationship, or information about deleting the mapping relationship, and indicate the remote UE to correspondingly update, modify, or delete the mapping relationship. Alternatively, the relay UE may directly send, to the remote UE, information about a new first mapping relationship obtained after modification. This is not limited in this embodiment of this application.

Optionally, after receiving the SI change indication of the gNB, where the SI change indication indicates that content of some system messages changes, the relay UE receives updated SI broadcast by the gNB, and then sends the updated SI to the remote UE in the multicast or broadcast manner.

In another possible implementation, after determining the N destination identifiers corresponding to the M SIBs or SI messages, the first terminal device sends, to the one or more second terminal devices, information about a destination identifier corresponding to each of the M SIBs or SI messages. Correspondingly, the one or more second terminal devices receive the information that is about the destination identifier corresponding to each of the M SIBs or SI messages and that is sent by the first terminal device.

Optionally, the relay UE may send the information about the destination identifier to the remote UE through a PC5 interface. Alternatively, the relay UE may establish a unicast connection to the remote UE by using a default DST ID. The default DST ID is also associated with the service type. It should be understood that, in a unicast communication process, relay UE at two ends of the SL may further periodically update the L2ID when communicating with the remote UE, to ensure communication security. Details are not described herein again.

Optionally, when an SI message or SIB that the remote UE is interested in changes, and a new system message request is initiated, the relay UE needs to re-assign a multicast identifier L2ID based on an SI message or SIB re-requested by the remote UE.

It should be understood that, different from the foregoing process in which the relay UE sends the information about the first mapping relationship to the remote UE, when determining that the remote UE currently requests the SI message 1, and determining that the multicast identifier corresponding to the SI message 1 is the L2ID 1, the relay UE may send the multicast identifier L2ID 1 to the remote UE, and does not need to send the information about the first mapping relationship.

It should be further understood that the relay UE may send the multicast identifier L2ID 1 to the remote UE after the first request message is sent, and the relay UE may send the first mapping relationship to the remote UE before or after the first request message is sent. Alternatively, when new remote UE establishes a connection to the relay UE, the relay UE directly sends the multicast identifier L2ID 1 or the information about the first mapping relationship to the new remote UE in the unicast manner.

Optionally, the multicast identifier L2ID 1 or the information about the first mapping relationship may be carried in a discovery message and sent to the remote UE, or may be transmitted by using the PC5-RRC signaling after the unicast connection is established. This is not limited in this embodiment of this application.

In an embodiment, after receiving the M SIBs or SI messages sent by the relay UE, the remote UE may send a feedback message to the relay UE, to notify the relay UE whether the M SIBs or SI messages are successfully received. In this scenario, the method 200 may further include the following step.

S250: The one or more second terminal devices send a feedback message to the first terminal device, and correspondingly, the first terminal device receives the feedback message, where the feedback message indicates whether the second message is successfully received.

Optionally, when the first terminal device determines, based on the feedback message, that each second terminal device successfully receives the second message, the first terminal device may stop sending the M SIBs or SI messages. Optionally, after all relay UEs determine that all the one or more remote UEs receive the SI, the relay UEs stop sending the multicast message or the broadcast message.

It should be understood that for different broadcast and multicast manners, S250 may correspond to different implementation processes.

In an embodiment, if the first terminal device sends the second message to the one or more second terminal devices in the broadcast message manner in S230, when the first terminal device receives feedback messages of all the one or more second terminal devices, and determines, based on the feedback messages, that all the one or more second terminal devices successfully receive the second message, the first terminal device stops sending the broadcast message.

In another embodiment, if the first terminal device sends the second message to the one or more second terminal devices in a multicast message manner in S230, because different groups send different multicast messages (for example, N groups send N different multicast messages), when the first terminal device receives feedback messages of all the second terminal devices to which each group correspondingly sends the first request message, and determines, based on the feedback messages, that all the second terminal devices to which each group correspondingly sends the first request message successfully receive the second message, the first terminal device stops sending the multicast message. Optionally, the method 200 may not include a process of S250. For example, a quantity of times that the first terminal device sends the broadcast message and the multicast message to the second terminal device is preset. For example, the relay UE may send the multicast message or the broadcast message to the one or more remote UEs for only three times, and then stop sending. This is not limited in this embodiment of this application.

In addition, in this embodiment of this application, when the SI changes, for example, when the relay UE receives, by paging downlink control information (DCI), the SI change indication sent by the gNB, where the SI change indication indicates that a correspondence between the SI message and the SIB 1 changes, the relay UE may not need to update the destination identifier, and may continue to send the multicast message or the broadcast message by using the previously assigned destination identifier.

In conclusion, according to the method 200, the relay UE may send the SI message or the SIB to the one or more remote UEs in the multicast message manner. When the relay UE receives an SI request that the one or more remote UEs send to request to obtain the SI message or the SIB, the relay UE may group all the SI messages or SIBs into one group and assign the multicast identifier L2ID to the group, and send the multicast identifier L2ID to each remote UE in the unicast manner. Alternatively, all the SI messages or SIBs are grouped into a plurality of groups (for example, N groups), one multicast identifier L2ID is assigned to each group, and a first mapping relationship between the multicast identifier L2ID and the SI message or the SIB is sent to each remote UE in the unicast manner. Subsequently, the relay UE may send the SI to the one or more remote UEs in a manner of sending the multicast message on the SL. This improves the SI sending efficiency. In addition, when the multicast identifier or the SI changes, the relay UE may further maintain information about the first mapping relationship between the multicast identifier L2ID and the SI message or the SIB, and notify, on the SL, a related remote UE in the unicast manner. This further improves the SI sending efficiency and the SI update efficiency.

In another embodiment, the relay UE may receive the first request message sent by the remote UE. However, the relay UE serves only as a relay device, does not parse the content of the first request message, and forwards the first request message to the gNB.

Figure 3:
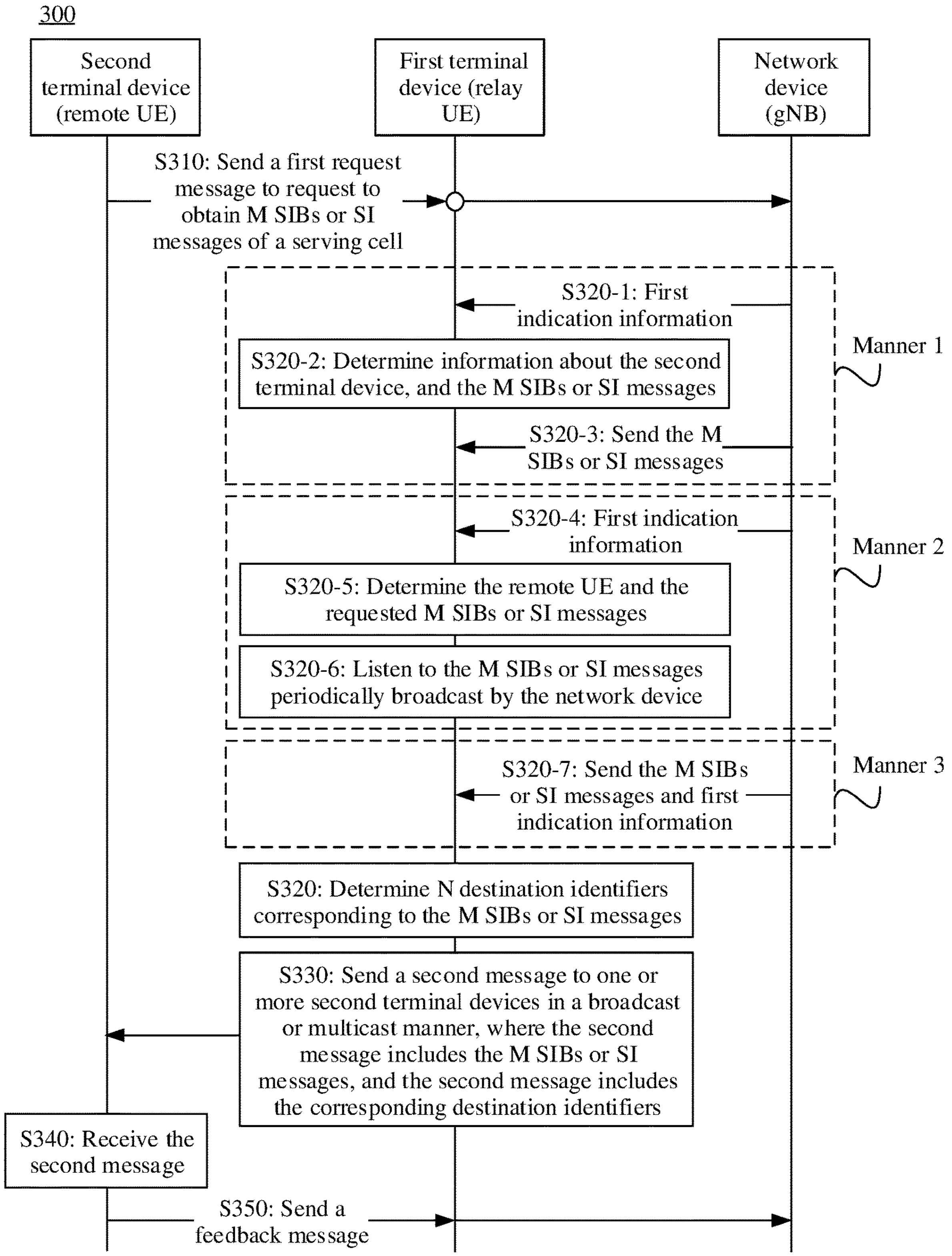
FIG. 3 is a schematic flowchart of another system information SI transmission method according to an embodiment of this application.

In this scenario, an embodiment of this application further provides another system information SI transmission method. FIG. 3 is a schematic flowchart of another system information SI transmission method according to an embodiment of this application. It should be understood that the method 300 may be applied to the foregoing wireless communication system 100 including the first terminal device (relay UE), the second terminal device (remote UE), and the network device (base station). The first terminal device (relay UE) establishes a sidelink SL connection to one or more second terminal devices (remote UE).

As shown in FIG. 3, the method 300 includes the following content.

S310: The one or more second terminal devices send a first request message to the first terminal device, and correspondingly, the first terminal device receives the first request message sent by the one or more second terminal devices, and sends the first request message to the network device. The first request message is used to request to obtain M SIBs or SI messages of a serving cell.

Optionally, with relay of the relay UE, the remote UE in a connected state may directly send the first request message to a gNB by using RRC signaling. Because the relay UE performs relay by using a radio link control (RLC) layer, and an RRC message is higher layer signaling, the relay UE cannot learn content of the first request message of the remote UE, that is, the relay UE cannot learn the M SIBs or SI messages requested by the remote UE.

Therefore, the gNB may forward, to the relay UE, the M SIBs or SI messages requested by the remote UE. In this case, the relay UE obtains the M requested SIBs or SI messages in the following three manners.

Manner 1

S320-1: The network device sends first indication information to the first terminal device, where the first indication information indicates the one or more second terminal devices that send the first request message and the requested M SIBs or SI messages.

For example, the remote UE may directly send the first request message to the gNB by using the RRC signaling. The gNB sends, based on the first request message, the first indication information to the relay UE corresponding to the remote UE. The first indication information indicates the M SIBs or SI messages and the remote UE that requests the M SIBs or SI messages. Then, the gNB may send the M SIBs or SI messages to the relay UE by using a separate message.

Optionally, the first indication information includes content of a plurality of groups (a remote UE ID-the requested SIB or SI message). The relay UE may clearly determine, based on content of the first indication information, an SIB or SI message requested by each of one or more remote UEs. The SIB or SI message requested by each remote UE may be one or more of the M SIBs or SI messages.

Optionally, the remote UE ID may be an ID self-assigned by the remote UE, and is notified to the relay UE in a unicast connection establishment process, or may be temporary ID information assigned by the relay UE to the remote UE, or may be a cell temporary identifier (for example, a C-RNTI) of the remote UE. This is not limited in this embodiment of this application.

S320-2: The first terminal device determines, based on the first indication information, information about the one or more second terminal devices, and the M SIBs or SI messages.

S320-3: The network device sends the M SIBs or SI messages to the first terminal device.

Manner 2

S320-4: The network device sends first indication information to the first terminal device, where the first indication information indicates the one or more second terminal devices that send the first request message and the requested M SIBs or SI messages.

S320-5: The first terminal device determines, based on the first indication information, information about the one or more second terminal devices, and the M SIBs or SI messages.

S320-6: The first terminal device listens to the M SIBs or SI messages periodically broadcast by the network device.

It should be understood that a difference between the manner 2 and the manner 1 lies in that after sending the first indication information to the relay UE corresponding to the remote UE, the gNB no longer actively sends the M SIBs or SI messages to the relay UE, but continues to periodically broadcast the SI to the relay UE until the relay UE obtains the M SIBs or SI messages, and then S320 is performed. This method can reduce signaling overheads.

Manner 3

S320-7: The network device sends the M SIBs or SI messages and first indication information to the first terminal device, where the first indication information indicates the one or more second terminal devices that send the first request message and the requested M SIBs or SI messages.

For example, the remote UE may directly send the first request message to the gNB by using the RRC signaling. The gNB delivers, based on the first request message by using the RRC signaling, the first request message carrying the first indication information to the relay UE corresponding to the remote UE. The first indication information indicates the remote UE that requests the M SIBs or SI messages.

Optionally, the first indication information may be ID information of the remote UE, for example, 1-bit indication information.

It should be understood that, in any one of the foregoing manner 1 to manner 3, the relay UE may learn M SIBs or SI messages requested by the one or more remote UEs. Then, the following process of S320 to S350 is performed.

S320: The first terminal device sends, based on the N destination identifiers, the M SIBs or SI messages to the one or more second terminal devices in a broadcast or multicast manner.

S330: The first terminal device sends a second message to the one or more second terminal devices in the broadcast or multicast manner, where the second message includes the M SIBs or SI messages, and the second message includes the corresponding destination identifiers.

S340: The one or more second terminal devices receive the second message sent by the first terminal device in the broadcast or multicast manner.

S350: The one or more second terminal devices send a feedback message to the first terminal device, and correspondingly, the first terminal device receives the feedback message, where the feedback message indicates whether the second message is successfully received. The first terminal device may determine, based on the feedback message, whether each second terminal device successfully receives the requested SIB or SI message.

Alternatively, in S350, the one or more second terminal devices send the feedback message to the network device through relay of the first terminal device, and the network device determines, based on the feedback message, whether each second terminal device successfully receives the M SIBs or SI messages.

It should be understood that, for the process of S320 to S350, refer to an implementation process of S220 to S250 in the foregoing method 200. For brevity, details are not described herein again.

In the foregoing method, more manners may be provided, so that the relay UE can obtain the SI request sent by the one or more remote UEs, and determine the SI messages or SIBs requested by the one or more remote UEs. Then, the relay UE sends the SI to the one or more remote UEs in the broadcast or multicast manner with reference to the foregoing manners. This improves SI sending efficiency.

With reference to FIG. 1 to FIG. 3, the foregoing describes in detail the system information SI transmission method in embodiments of this application. With reference to FIG. 4 to FIG. 9, the following describes in detail a system information SI transmission apparatus in embodiments of this application.

Figure 4:
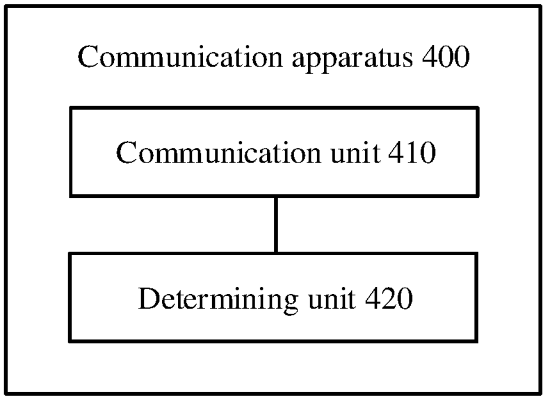
FIG. 4 is a schematic block diagram of a system information SI transmission apparatus according to an embodiment of this application.

FIG. 4 is a schematic block diagram of a system information SI transmission apparatus according to an embodiment of this application. The apparatus 400 may correspond to the first terminal device (relay UE) described in the method 200 and the method 300, or may be a chip or a component used in the first terminal device (relay UE). In addition, modules or units in the apparatus 400 are configured to perform actions or processing processes performed by the first terminal device (relay UE) in the method 200 or 300. The first terminal device establishes a sidelink SL connection to each second terminal device, and each second terminal device obtains a network service of a target cell through the first terminal device. The target cell is a serving cell of the first terminal device.

As shown in FIG. 4, the communication apparatus 400 may include a communication unit 410 and a determining unit 420.

The communication unit 410 is configured to receive a first request message sent by one or more second terminal devices. The first request message is used to request to obtain M system information blocks SIBs or system information SI messages of the serving cell.

The determining unit 420 is configured to determine N destination identifiers corresponding to the M SIBs or SI messages, where N is an integer greater than or equal to 1, and $N \leq M$.

The communication unit 410 is further configured to send a second message to the one or more second terminal devices in a broadcast or multicast manner. The second message includes the M SIBs or SI messages, and the second message includes the corresponding destination identifiers.

In an embodiment, the determining unit 420 is further configured to determine that the M SIBs or SI messages correspond to one same destination identifier. The destination identifier indicates to send the M SIBs or SI messages in the broadcast manner.

Alternatively, the determining unit 420 is further configured to determine that each of the M SIBs or SI messages corresponds to a different destination identifier. The destination identifier indicates to send the M SIBs or SI messages in the multicast manner.

Alternatively, the determining unit 420 is further configured to determine that K SIBs or SI messages of the M SIBs or SI messages correspond to one same destination identifier, where 1≤K<M. The destination identifier indicates to send the M SIBs or SI messages in the multicast manner.

In an embodiment, when the M SIBs or SI messages correspond to the same destination identifier, the destination identifier is a preset identifier.

In another embodiment, when the M SIBs or SI messages correspond to the same destination identifier, the second message further includes an identifier of the first terminal device.

In an embodiment, the communication unit 410 is further configured to send information about a first mapping relationship to the one or more second terminal devices. The first mapping relationship indicates a correspondence between the M SIBs or SI messages and the N destination identifiers.

In an embodiment, when the first mapping relationship changes, the communication unit 410 is further configured to send information about an updated first mapping relationship to the second terminal device.

Alternatively, when a third terminal device accesses the apparatus, the communication unit 410 is further configured to send the information about the first mapping relationship to the third terminal device.

In an embodiment, after the determining unit 420 determines the N destination identifiers corresponding to the M SIBs or SI messages, the communication unit 410 is further configured to send, to the one or more second terminal devices, information about a destination identifier corresponding to the second message. The destination identifier is determined by the first terminal device based on a first mapping relationship. The first mapping relationship indicates a correspondence between the M SIBs or SI messages and the N destination identifiers.

In still another embodiment, before the communication unit 410 sends the M SIBs or SI messages to the one or more second terminal devices, the communication unit 410 is further configured to receive the M SIBs or SI messages periodically broadcast by a network device.

Alternatively, the communication unit 410 is further configured to send the first request message to a network device, and receive the M SIBs or SI messages sent by the network device.

In still another embodiment, the communication unit 410 is further specifically configured to periodically send, to the one or more second terminal devices, the M SIBs or SI messages in the broadcast or multicast manner.

Optionally, the first request message is sent by using radio resource control RRC signaling, media access control MAC CE signaling, or sidelink control information SCI.

In still another embodiment, the communication unit 410 is further specifically configured to receive a feedback message sent by the one or more second terminal devices, where the feedback message indicates whether the M SIBs or SI messages are successfully received. When the determining unit 420 determines that each second terminal device successfully receives the M SIBs or SI messages, the communication unit 410 stops sending the M SIBs or SI messages.

For example, the communication unit 410 is configured to perform processes of S210, S230, S250, and the like in the method 200. The determining unit 420 is configured to perform processes of S220 and the like in the method 200. Alternatively, the communication unit 410 is configured to perform processes of S310, S330, S350, and the like in the method 300. The determining unit 420 is configured to perform processes of S320 and the like in the method 300. Specific processes of performing the foregoing corresponding steps by the units are described in detail in the method 200 and the method 300. For brevity, details are not described herein.

Figure 5:
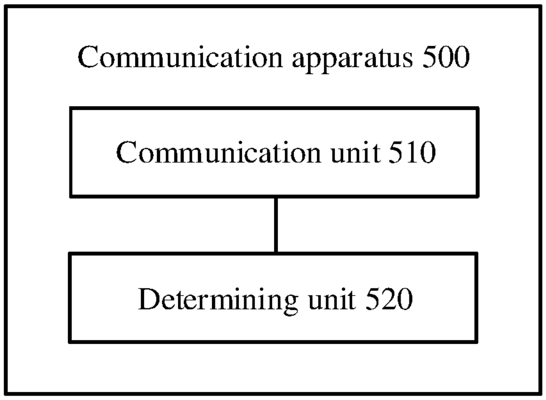
FIG. 5 is a schematic block diagram of another system information SI transmission apparatus according to an embodiment of this application.

FIG. 5 is a schematic block diagram of another system information SI transmission apparatus according to an embodiment of this application. The apparatus 500 may correspond to (for example, may be used in or may be) the second terminal device (remote UE) described in the method 200 and the method 300. In addition, modules or units in the apparatus 500 are configured to perform actions or processing processes performed by the second terminal device (remote UE) in the method 200. A first terminal device establishes a sidelink SL connection to each second terminal device, and each second terminal device obtains a network service of a target cell through the first terminal device. The target cell is a serving cell of the first terminal device.

As shown in FIG. 5, the communication apparatus 500 may include a communication unit 510 and a determining unit 520.

The communication unit 510 is configured to send a first request message to the first terminal device. The first request message is used to request to obtain M system information blocks SIBs or system information SI messages of the serving cell.

The communication unit 510 is further configured to receive a second message sent by the first terminal device in a broadcast or multicast manner. The second message includes the M SIBs or SI messages. The M SIBs or SI messages correspond to N destination identifiers, and the second message includes the corresponding destination identifiers, where N is an integer greater than or equal to 1, and N≤M.

In an embodiment, the M SIBs or SI messages correspond to one same destination identifier. The destination identifier indicates the first terminal device to send the M SIBs or SI messages in the broadcast manner.

Alternatively, each of the M SIBs or SI messages corresponds to a different destination identifier. The destination identifier indicates the first terminal device to send the M SIBs or SI messages in the multicast manner.

Alternatively, K SIBs or SI messages of the M SIBs or SI messages correspond to one same destination identifier, where 1≤K<M. The destination identifier indicates the first terminal device to send the M SIBs or SI messages in the multicast manner.

In another embodiment, when the M SIBs or SI messages correspond to the same destination identifier, the destination identifier is a preset identifier.

In still another embodiment, when the M SIBs or SI messages correspond to the same destination identifier, the M SIBs or SI messages further include an identifier of the first terminal device, and the communication unit 510 is further configured to receive the second message that includes the identifier of the first terminal device and that is sent by the first terminal device. The determining unit 520 is further configured to obtain, based on the second message, a corresponding SIB or SI message.

In an embodiment, the communication unit 510 is further configured to receive information that is about a first mapping relationship and that is sent by the first terminal device. The first mapping relationship indicates a correspondence between the M SIBs or SI messages and the N destination identifiers.

The determining unit 520 is further configured to determine, based on the information about the first mapping relationship, a destination identifier used for receiving the second message sent by the first terminal device. The communication unit 510 is further configured to receive the second message that includes the destination identifier and that is sent by the first terminal device. The determining unit 520 is further configured to obtain, based on the second message, a corresponding SIB or SI message.

In an embodiment, when the first mapping relationship changes, the communication unit 510 is further configured to receive information that is about an updated first mapping relationship and that is sent by the first terminal device; and/or when a third terminal device accesses the first terminal device, the one or more second terminal devices receive the information that is about the updated first mapping relationship and that is sent by the first terminal device.

In another embodiment, the communication unit 510 is further configured to receive information about a destination identifier that corresponds to each SIB or SI message in the second message and that is sent by the first terminal device. The destination identifier is determined by the first terminal device based on a first mapping relationship. The first mapping relationship indicates a correspondence between the M SIBs or SI messages and the N destination identifiers.

In still another embodiment, the communication unit 510 is further specifically configured to periodically receive the second message sent by the first terminal device in the broadcasting or multicast manner.

Optionally, the first request message is sent by using radio resource control RRC signaling, media access control MAC CE signaling, or sidelink control information SCI.

In another embodiment, the communication unit 510 is further configured to send a feedback message to the first terminal device, where the feedback message indicates whether the M SIBs or SI messages are successfully received. When the determining unit 520 determines that the second message is successfully received, the communication unit 510 stops receiving the second message sent by the first terminal device.

For example, the communication unit 510 is configured to perform processes of S210, S230, S250, and the like in the method 200. The determining unit 520 is configured to perform processes of S240 and the like in the method 200. Alternatively, the communication unit 510 is configured to perform processes of S310, S330, S350, and the like in the method 300. The determining unit 520 is configured to perform processes of S340 and the like in the method 300. Specific processes of performing the foregoing corresponding steps by the units are described in detail in the method 200 and the method 300. For brevity, details are not described herein.

Figure 6:
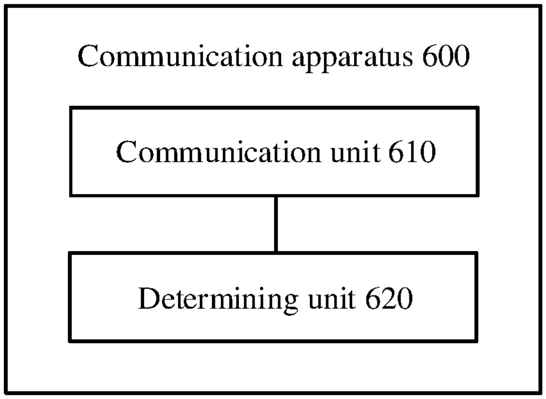
FIG. 6 is a schematic block diagram of another system information SI transmission apparatus according to an embodiment of this application.

FIG. 6 is a schematic block diagram of another system information SI transmission apparatus according to an embodiment of this application. The apparatus 600 may correspond to (for example, may be used in or may be) the network device (gNB) described in the method 200 and the method 300. In addition, modules or units in the apparatus 600 are configured to perform actions or processing processes performed by the network device (gNB) in the method 200 and the method 300. As shown in FIG. 6, the communication apparatus 600 may include: a communication unit 610 and a determining unit 620.

For example, the determining unit 620 is configured to perform processes of S220-1 and the like in the method 200, and the communication unit 610 is configured to perform processes of S220-2, S220-3, and the like in the method 200. Alternatively, the determining unit 620 is configured to perform processes of S320-2, S320-5 and the like in the method 300, and the communication unit 610 is configured to perform processes of S320-1, S320-3, S320-4, S320-7, and the like in the method 300. Specific processes of performing the foregoing corresponding steps by the units are described in detail in the method 200 and the method 300. For brevity, details are not described herein.

Figure 7:
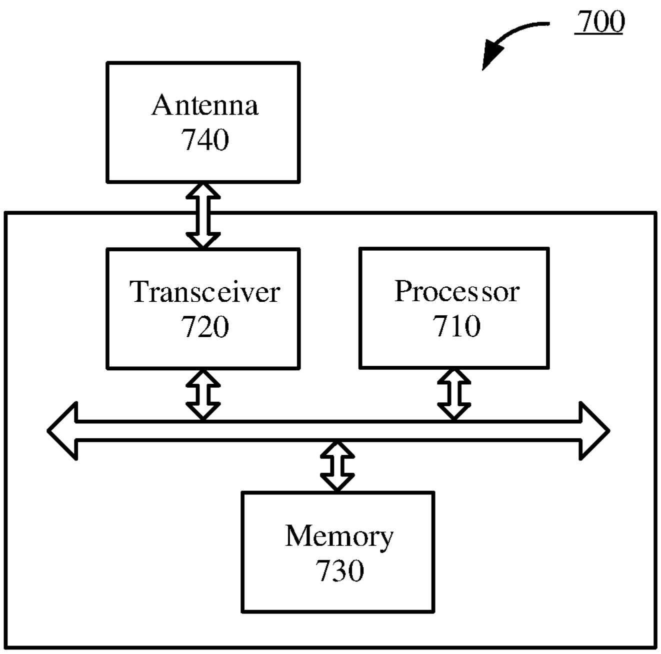
FIG. 7 is a schematic diagram of a structure of a terminal device according to an embodiment of this application.

FIG. 7 is a schematic diagram of a structure of a terminal device according to an embodiment of this application. As shown in FIG. 7, the terminal device 700 includes a processor 710 and a transceiver 720. Optionally, the terminal device 700 further includes a memory 730. The processor 710, the transceiver 720, and the memory 730 communicate with each other through an internal connection path, to transfer a control and/or data signal. The memory 730 is configured to store a computer program. The processor 710 is configured to invoke the computer program from the memory 730 and run the computer program, to control the transceiver 720 to receive and send a signal.

The processor 710 and the memory 730 may be integrated into one processing apparatus. The processor 710 is configured to execute program code stored in the memory 730 to implement a function of the first terminal device (relay UE) in the foregoing method embodiments. During specific implementation, the memory 730 may alternatively be integrated into the processor 710, or may be independent of the processor 710. The transceiver 720 may be implemented by using a transceiver circuit.

The terminal device may further include an antenna 740, configured to send, by using a radio signal, uplink data or uplink control signaling output by the transceiver 720, or send, after receiving downlink data or downlink control signaling, the downlink data or the downlink control signaling to the transceiver 720 for further processing.

It should be understood that the terminal device 700 may correspond to the first terminal device (relay UE) in the method 200 or 300 according to embodiments of this application. The terminal device 700 may alternatively be a chip or a component used in the first terminal device (relay UE). In addition, modules in the terminal device 700 implement corresponding processes in the method 200 or 300. Specific processes of performing the foregoing corresponding steps by units are described in detail in the method 200 or 300. For brevity, details are not described herein.

Figure 8:
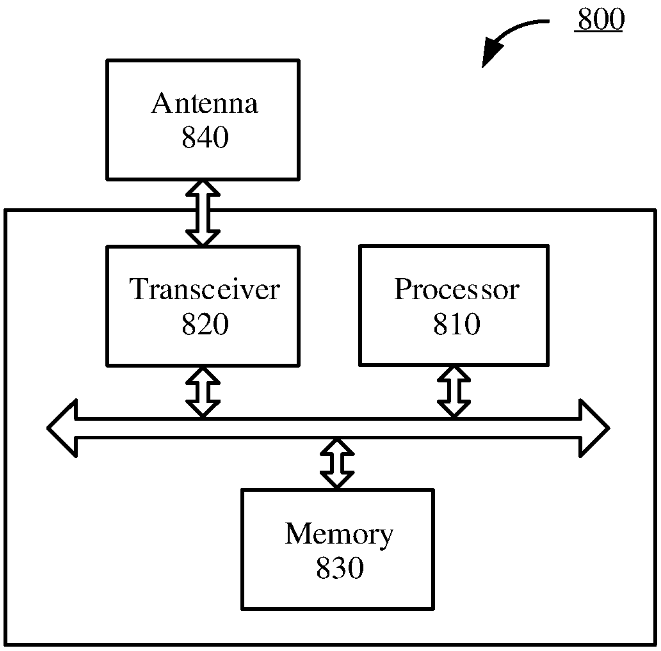
FIG. 8 is a schematic diagram of a structure of another terminal device according to an embodiment of this application.

FIG. 8 is a schematic diagram of a structure of another terminal device according to an embodiment of this application. As shown in FIG. 8, the terminal device 800 includes a processor 810 and a transceiver 820. Optionally, the terminal device 800 further includes a memory 830. The processor 810, the transceiver 820, and the memory 830 communicate with each other through an internal connection path, to transfer a control and/or data signal. The memory 830 is configured to store a computer program. The processor 810 is configured to invoke the computer program from the memory 830 and run the computer program, to control the transceiver 820 to receive and send a signal.

The processor 810 and the memory 830 may be integrated into one processing apparatus. The processor 810 is configured to execute program code stored in the memory 830 to implement a function of the second terminal device (remote UE) in the foregoing method embodiments. During specific implementation, the memory 830 may alternatively be integrated into the processor 810, or may be independent of the processor 810. The transceiver 820 may be implemented by using a transceiver circuit.

The terminal device may further include an antenna 840, configured to send, by using a radio signal, uplink data or uplink control signaling output by the transceiver 820, or send, after receiving downlink data or downlink control signaling, the downlink data or the downlink control signaling to the transceiver 820 for further processing.

It should be understood that the terminal device 800 may correspond to the second terminal device (remote UE) in the method 200 or 300 according to embodiments of this application. The terminal device 800 may alternatively be a chip or a component used in the second terminal device (remote UE). In addition, modules in the terminal device 800 implement corresponding processes in the method 200 or 300. Specific processes of performing the foregoing corresponding steps by units are described in detail in the method 200 or 300. For brevity, details are not described herein.

Figure 9:
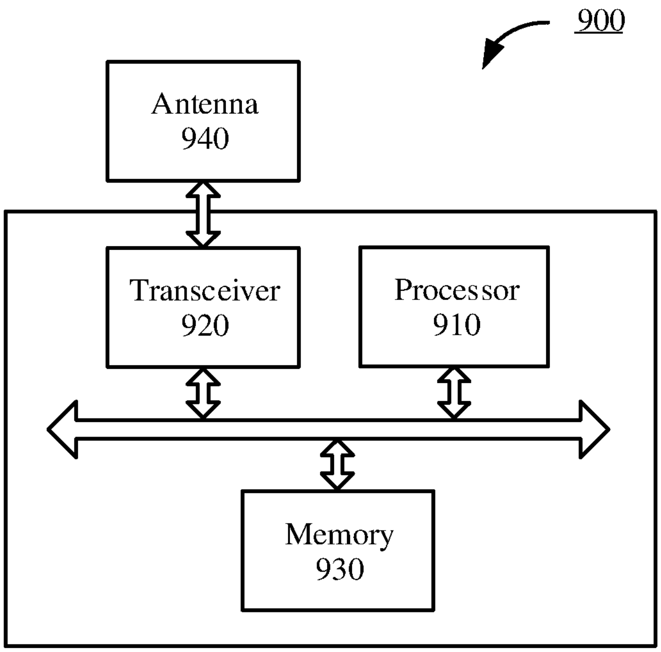
FIG. 9 is a schematic diagram of a structure of a network device according to an embodiment of this application.

FIG. 9 is a schematic diagram of a structure of a network device according to an embodiment of this application. As shown in FIG. 9, the network device 900 (for example, a base station) includes a processor 910 and a transceiver 920. Optionally, the network device 900 further includes a memory 930. The processor 910, the transceiver 920, and the memory 930 communicate with each other through an internal connection path, to transfer a control and/or data signal. The memory 930 is configured to store a computer program. The processor 910 is configured to invoke the computer program from the memory 930 and run the computer program, to control the transceiver 920 to receive and send a signal.

The processor 910 and the memory 930 may be integrated into one processing apparatus. The processor 910 is configured to execute program code stored in the memory 930 to implement a function of the base station in the foregoing method embodiments. During specific implementation, the memory 930 may alternatively be integrated into the processor 910, or may be independent of the processor 910. The transceiver 920 may be implemented by using a transceiver circuit.

The network device may further include an antenna 940, configured to send, by using a radio signal, downlink data or downlink control signaling output by the transceiver 920, or send, after receiving uplink data or uplink control signaling, the uplink data or the uplink control signaling to the transceiver 920 for further processing.

It should be understood that the network device 900 may correspond to the base station in the method 200 and the method 300 according to embodiments of this application. The network device 900 may alternatively be a chip or a component used in the base station. In addition, modules in the network device 900 implement corresponding processes in the method 200 and the method 300. Specific processes of performing the foregoing corresponding steps by units are described in detail in the method 200 and the method 300. For brevity, details are not described herein.

A person of ordinary skill in the art may be aware that the units and algorithm steps in the examples described with reference to embodiments disclosed in this specification can be implemented by electronic hardware or a combination of computer software and electronic hardware. Whether these functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the described system, apparatus, and unit, refer to a corresponding process in the method embodiments. Details are not described herein again.

In the several embodiments provided by this application, it should be understood that the disclosed system, apparatus, and method may be implemented in other manners. For example, the described apparatus embodiments are only examples. For example, the unit division is only logical function division and may be other division during actual implementation. For example, a plurality of units or components may be combined. In addition, the displayed or discussed mutual couplings or communication connections may be indirect couplings or communication connections through some interfaces, apparatuses, or units.

In addition, function units in embodiments of this application may be integrated into one physical entity, or each of the units may be separately corresponding to one physical entity, or two or more units may be integrated into one physical entity.

When the functions are implemented in a form of a software functional unit and sold or used as an independent product, the functions may be stored in a computer-readable storage medium. Based on such an understanding, the technical solutions in this application essentially, or the part contributing to the conventional technology, or some of the technical solutions may be implemented in the form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

What is claimed is:

1. An information transmission method performed by a first terminal device in a system comprising the first terminal device and one or more second terminal devices, the first terminal device establishes a sidelink (SL) connection to each second terminal device, each second terminal device obtains a network service of a target cell through the first terminal device, the target cell is a serving cell of the first terminal device, wherein the method comprises:

receiving, by the first terminal device, a first request message from one or more second terminal devices, wherein the first request message is used to request to obtain M system information blocks (SIBs) or system information (SI) messages of a target cell, wherein M is an integer;

determining, by the first terminal device, N destination identifiers corresponding to the M SIBs or SI messages, wherein N is an integer greater than or equal to 1, and N≤M, and wherein determining by the first terminal device, N destination identifiers corresponding to the M SIBs or SI messages comprises:

after receiving the first request message, parsing content of the first request message to determine the M SIBs or SI messages required by all of the one or more second terminal devices;

then determining, by the first terminal device, that each of the M SIBs or SI messages corresponds to a different destination identifier, wherein the different destination identifier indicates to send the M SIBs or SI messages in a multicast manner; or then determining, by the first terminal device, that K SIBs or SI messages of the M SIBs or SI messages correspond to one same destination identifier, wherein 1≤K<M, and the destination identifier indicates to send the M SIBs or SI messages in the multicast manner; and sending, by the first terminal device, a second message to the one or more second terminal devices in the multicast manner, wherein the second message comprises the M SIBs or SI messages, and the second message comprises the corresponding destination identifiers.

2. The method according to claim 1, wherein based on the M SIBs or SI messages corresponding to a same destination identifier, the destination identifier is a preset identifier.

3. The method according to claim 1, wherein based on the M SIBs or SI messages corresponding to a same destination identifier, the second message further comprises an identifier of the first terminal device.

4. The method according to claim 1, wherein the method further comprises:

sending, by the first terminal device, information about a first mapping relationship to the one or more second terminal devices, wherein the first mapping relationship indicates a correspondence between the M SIBs or SI messages and the N destination identifiers.

5. The method according to claim 1, wherein after the determining, by the first terminal device, N destination identifiers corresponding to the M SIBs or SI messages, the method further comprises:

sending, by the first terminal device to the one or more second terminal devices, information about a destination identifier corresponding to the second message, wherein the destination identifier is determined by the first terminal device based on a first mapping relationship, and the first mapping relationship indicates a correspondence between the M SIBs or SI messages and the N destination identifiers.

6. An information transmission method performed by one or more second terminal devices in a system comprising a first terminal device and the one or more second terminal devices, the first terminal device establishes a sidelink (SL) connection to each second terminal device, each second terminal device obtains a network service of a target cell through the first terminal device, the target cell is a serving cell of the first terminal device, wherein the method comprises:

sending, by one or more second terminal devices, a first request message to a first terminal device, wherein the first request message is used to request to obtain M system information blocks (SIBs) or system information (SI) messages of a target cell, wherein M is an integer; and receiving, by the one or more second terminal devices, a second message sent by the first terminal device in a broadcast or multicast manner, wherein the second message comprises the M SIBs or SI messages, the M SIBs or SI messages correspond to N destination identifiers, the N destination identifiers corresponding to the M SIBs or SI messages determined by parsing content of the first request message to determine the M SIBs or SI messages required by all or some of the one or more second terminal devices, the second message comprises the corresponding destination identifiers, N is an integer greater than or equal to 1, and N≤M, and wherein:

each of the M SIBs or SI messages corresponds to a different destination identifier, and the different destination identifier indicates the first terminal device to send the M SIBs or SI messages in the multicast manner; or K SIBs or SI messages of the M SIBs or SI messages correspond to one same destination identifier, 1≤K<M, and the one same destination identifier indicates the first terminal device to send the M SIBs or SI messages in the multicast manner.

7. The method according to claim 6, wherein based on the M SIBs or SI messages corresponding to a same destination identifier, the destination identifier is a preset identifier.

8. The method according to claim 6, wherein based on the M SIBs or SI messages correspond to a same destination identifier, the second message further comprises an identifier of the first terminal device, and the method further comprises:

receiving, by the one or more second terminal devices, the second message that comprises the identifier of the first terminal device and is sent by the first terminal device; and obtaining, based on the second message, a corresponding SIB or SI message.

9. The method according to claim 6, wherein the method further comprises:

receiving, by the one or more second terminal devices, information about a first mapping relationship that is sent by the first terminal device, wherein the first mapping relationship indicates a correspondence between the M SIBs or SI messages and the N destination identifiers;

determining, by the one or more second terminal devices based on the information about the first mapping relationship, a destination identifier used for receiving the second message sent by the first terminal device;

receiving, by the one or more second terminal devices, the second message that comprises the destination identifier and that is sent by the first terminal device; and obtaining, based on the second message, a corresponding SIB or SI message.

10. The method according to claim 9, wherein the method further comprises:

based on the first mapping relationship changing, receiving, by the one or more second terminal devices, information about an updated first mapping relationship that is sent by the first terminal device; and/or based on a third terminal device accessing the first terminal device, sending, by the first terminal device, the information about the first mapping relationship to the third terminal device.

11. The method according to claim 6, wherein the method further comprises:

receiving, by the one or more second terminal devices, information about a destination identifier corresponding to the second message that is sent by the first terminal device, wherein the destination identifier is determined by the first terminal device based on a first mapping relationship, and the first mapping relationship indicates a correspondence between the M SIBs or SI messages and the N destination identifiers.

12. An apparatus, comprising:

at least one processor; and a memory storing programming, the programming including instructions that, when executed by the at least one processor, cause the apparatus to perform:

receiving a first request message from one or more second terminal devices, wherein the first request message is used to request to obtain M system information blocks (SIBs) or system information (SI) messages of a target cell, wherein M is an integer;

determining N destination identifiers corresponding to the M SIBs or SI messages, wherein N is an integer greater than or equal to 1, and N≤M, and wherein determining by the first terminal device, N destination identifiers corresponding to the M SIBs or SI messages comprises:

after receiving the first request message, parsing content of the first request message to determine the M SIBs or SI messages required by all of the one or more second terminal devices;

then determining, by the first terminal device, that each of the M SIBs or SI messages corresponds to a different destination identifier, wherein the different destination identifier indicates to send the M SIBs or SI messages in a multicast manner; or then determining, by the first terminal device, that K SIBs or SI messages of the M SIBs or SI messages correspond to one same destination identifier, wherein 1≤K<M, and the destination identifier indicates to send the M SIBs or SI messages in the multicast manner; and sending a second message to the one or more second terminal devices in the multicast manner, wherein the second message comprises the M SIBs or SI messages, and the second message comprises the corresponding destination identifiers.

13. The apparatus according to claim 12, wherein based on the M SIBs or SI messages correspond to a same destination identifier, the destination identifier is a preset identifier.

14. The apparatus according to claim 12, wherein based on the M SIBs or SI messages corresponding to a same destination identifier, the second message further comprises an identifier of the apparatus.

15. The apparatus according to claim 12, wherein the instructions, when executed by the at least one processor, cause the apparatus further to perform:

sending information about a first mapping relationship to the one or more second terminal devices, wherein the first mapping relationship indicates a correspondence between the M SIBs or SI messages and the N destination identifiers.

16. The apparatus according to claim 12, wherein the instructions, when executed by the at least one processor, cause the apparatus further to perform:

sending to the one or more second terminal devices, information about a destination identifier corresponding to the second message, wherein the destination identifier is determined by the first terminal device based on a first mapping relationship, and the first mapping relationship indicates a correspondence between the M SIBs or SI messages and the N destination identifiers.

* * * * *